US012675925B2

(12) United States Patent
Arora et al.

(10) Patent No.: US 12,675,925 B2
(45) Date of Patent: Jul. 7, 2026

(54) COMPUTER NETWORK ACTIVITY SUMMARIZER AND CHAT INTERFACE

(71) Applicant: Adobe Inc., San Jose, CA (US)

(72) Inventors: Tarun Arora, Delhi (IN); Tanay Anand, Nodia (IN); Siddarth Ramesh, Nodia (IN); Shripad Deshmukh, Solapur (IN); Pranjal Prasoon, Nodia (IN); Piyush Dewnani, Bangalore (IN); Md Anis Alam, Nodia (IN); Jayakumar Subramanian, Nodia (IN); Gaurav Satija, Nodia (IN); Diwakar Reddy Yerragunta, Bangalore (IN); Deepthi Amirthagadeswaran, Bangalore (IN); Balaji Krishnamurthy, Nodia (IN); Avinash Katiyar, Gurugram (IN)

(73) Assignee: Adobe Inc., San Jose, CA (US)

( * ) Notice: Subject to any disclaimer, the term of this patent is extended or adjusted under 35 U.S.C. 154(b) by 181 days.

(21) Appl. No.: 18/380,059

(22) Filed: Oct. 13, 2023

(65) Prior Publication Data

US 2025/0124620 A1    Apr. 17, 2025

(51) Int. Cl.
*G06F 40/40* (2020.01)
*G06T 11/26* (2026.01)
*G06Q 30/0201* (2023.01)
*G06Q 30/0251* (2023.01)

(52) U.S. Cl.
CPC .............. *G06T 11/26* (2026.01); *G06F 40/40* (2020.01); *G06Q 30/020121* (2025.08); *G06Q 30/0251* (2013.01)

(58) Field of Classification Search
CPC ............................... G06T 11/206; G06F 40/40
USPC ............................................................ 704/9
See application file for complete search history.

(56) References Cited

U.S. PATENT DOCUMENTS

| | | | | |
|---|---|---|---|---|
| 12,147,758 | B1 * | 11/2024 | Thomas | G06F 40/18 |
| 2016/0253379 | A1 * | 9/2016 | Ford | G06F 11/362 |
| | | | | 707/721 |
| 2021/0240776 | A1 * | 8/2021 | Jawagal | G06N 3/049 |
| 2023/0368080 | A1 * | 11/2023 | Jha | G06N 20/20 |
| 2024/0303440 | A1 * | 9/2024 | Fabian | G06F 40/18 |
| 2024/0330765 | A1 * | 10/2024 | Oliveira | G06N 20/00 |

(Continued)

OTHER PUBLICATIONS

Lewis et al., "Retrieval-Augmented Generation for Knowledge-Intensive NLP Tasks", arXiv:2005.11401v4 [cs.CL], Apr. 12, 2021, 19 pgs. (Year: 2021).*

(Continued)

*Primary Examiner* — Fariba Sirjani
(74) *Attorney, Agent, or Firm* — Shook, Hardy & Bacon L.L.P.

(57) ABSTRACT

Various disclosed embodiments are directed to deriving, via a language model, a summary of data by converting or encoding table data into one or more natural language sentences, which are then used as input to the language model for generating the summary. One or more embodiments are additionally or alternatively directed to deriving, via a language model, a response to a user question or command via a chat interface by providing the language model with the generated summary as input. In this way, for example, the language model can use the summary as a prompt or other target context for providing a response.

19 Claims, 14 Drawing Sheets

(56)         References Cited

U.S. PATENT DOCUMENTS

| | | | | |
|---|---|---|---|---|
| 2024/0427742 A1* | 12/2024 | Guan | .................... | G06F 16/213 |
| 2025/0061104 A1* | 2/2025 | Hou | ..................... | G06F 16/245 |
| 2025/0106176 A1* | 3/2025 | Smiley | ................... | H04L 51/07 |
| 2025/0124620 A1* | 4/2025 | Arora | ..................... | G06F 40/30 |

OTHER PUBLICATIONS

Bogin et al., "Representing Schema Structure With Graph Neural Networks for Test-to-SQL Parsing", arXiv preprint arXiv:1905.06241 2019, 7 pages.

Yin et al, "TaBERT: Pretraining for Joint Understanding of Textual and Tabular Data", arXiv preprint arXiv:2005.08314, 2020, 15 pages.

Lida et al, "Tabbie: Pretrained Representations of Tabular Data", arXiv preprint arXiv:2015.02584, 2021, 11 pages.

M. Gull et al, "Customer Behavior Analysis Towards Online Shopping Using Data Mining", 2018 5th International Multi-Topic ICT Conference (IMTIC), Jamshoro, Pakistan, 2018, 5 pages.

Cherkasova et al., "Automated Anomaly Detection and Performance Modeling of Enterprise Applications", ACM Transactions on Computer Systems (TOCS) 27. No. 3, 2009, 32 pages.

Wang et al., "Rat-Sql: Relation-Aware Schema Encoding and Linking for Text-to-Sql Parsers", arXiv prepring arXiv:1911.04942, 219, 12 pages.

* cited by examiner

100

VERBALIZATION COMPONENT 112

SUMMARIZATION COMPONENT 114

CHAT INTERFACE COMPONENT 116

CONSUMER APPLICATION 118

MARKETER INTERVENTION PREDICTION COMPONENT 108

NETWORK(S) 110

105

PREPROCESSING COMPONENT 106

STITCHING COMPONENT 104

USER ACTIVITY EXTRACTOR 102

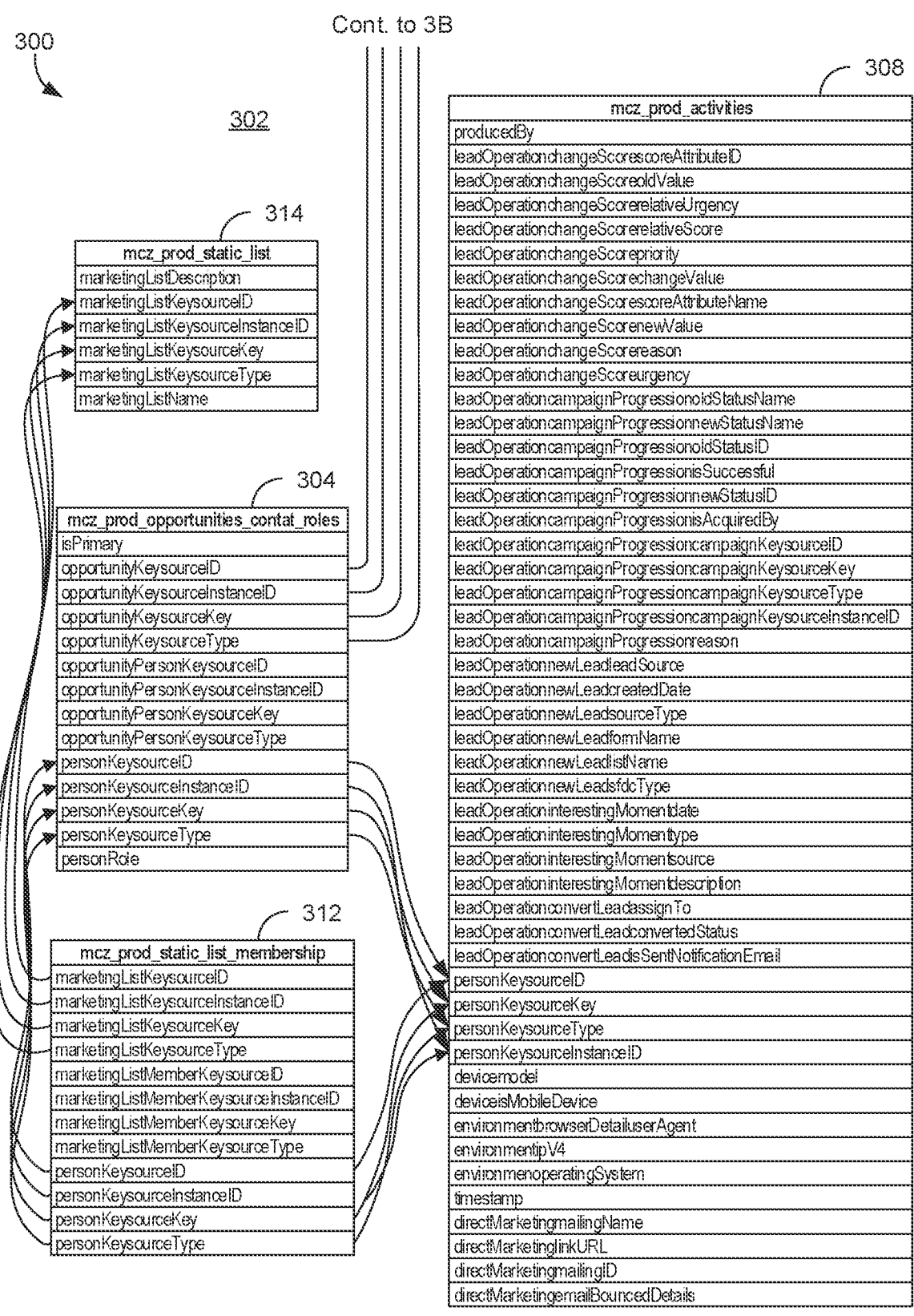

300

302

314 mcz_prod_static_list

| |
|---|
| marketingListDescription |
| marketingListKeysourceID |
| marketingListKeysourceInstanceID |
| marketingListKeysourceKey |
| marketingListKeysourceType |
| marketingListName |

304 mcz_prod_opportunities_contat_roles

| |
|---|
| isPrimary |
| opportunityKeysourceID |
| opportunityKeysourceInstanceID |
| opportunityKeysourceKey |
| opportunityKeysourceType |
| opportunityPersonKeysourceID |
| opportunityPersonKeysourceInstanceID |
| opportunityPersonKeysourceKey |
| opportunityPersonKeysourceType |
| personKeysourceID |
| personKeysourceInstanceID |
| personKeysourceKey |
| personKeysourceType |
| personRole |

312 mcz_prod_static_list_membership

| |
|---|
| marketingListKeysourceID |
| marketingListKeysourceInstanceID |
| marketingListKeysourceKey |
| marketingListKeysourceType |
| marketingListMemberKeysourceID |
| marketingListMemberKeysourceInstanceID |
| marketingListMemberKeysourceKey |
| marketingListMemberKeysourceType |
| personKeysourceID |
| personKeysourceInstanceID |
| personKeysourceKey |
| personKeysourceType |

308 mcz_prod_activities

| |
|---|
| producedBy |
| leadOperationchangeScorescoreAttributeID |
| leadOperationchangeScoreoldValue |
| leadOperationchangeScorerelativeUrgency |
| leadOperationchangeScorerelativeScore |
| leadOperationchangeScorepriority |
| leadOperationchangeScorechangeValue |
| leadOperationchangeScorescoreAttributeName |
| leadOperationchangeScorenewValue |
| leadOperationchangeScorereason |
| leadOperationchangeScoreurgency |
| leadOperationcampaignProgressionoldStatusName |
| leadOperationcampaignProgressionnewStatusName |
| leadOperationcampaignProgressionoldStatusID |
| leadOperationcampaignProgressionisSuccessful |
| leadOperationcampaignProgressionnewStatusID |
| leadOperationcampaignProgressionisAcquiredBy |
| leadOperationcampaignProgressioncampaignKeysourceID |
| leadOperationcampaignProgressioncampaignKeysourceKey |
| leadOperationcampaignProgressioncampaignKeysourceType |
| leadOperationcampaignProgressioncampaignKeysourceInstanceID |
| leadOperationcampaignProgressionreason |
| leadOperationnewLeadleadSource |
| leadOperationnewLeadcreatedDate |
| leadOperationnewLeadsourceType |
| leadOperationnewLeadformName |
| leadOperationnewLeadlistName |
| leadOperationnewLeadsfdcType |
| leadOperationinterestingMomentdate |
| leadOperationinterestingMomenttype |
| leadOperationinterestingMomentsource |
| leadOperationinterestingMomentdescription |
| leadOperationconvertLeadassignTo |
| leadOperationconvertLeadconvertedStatus |
| leadOperationconvertLeadisSentNotificationEmail |
| personKeysourceID |
| personKeysourceKey |
| personKeysourceType |
| personKeysourceInstanceID |
| devicemodel |
| deviceisMobileDevice |
| environmentbrowserDetailuserAgent |
| environmentipV4 |
| environmenoperatingSystem |
| timestamp |
| directMarketingmailingName |
| directMarketinglinkURL |
| directMarketingmailingID |
| directMarketingemailBouncedDetails |

Cont. from 3A

800

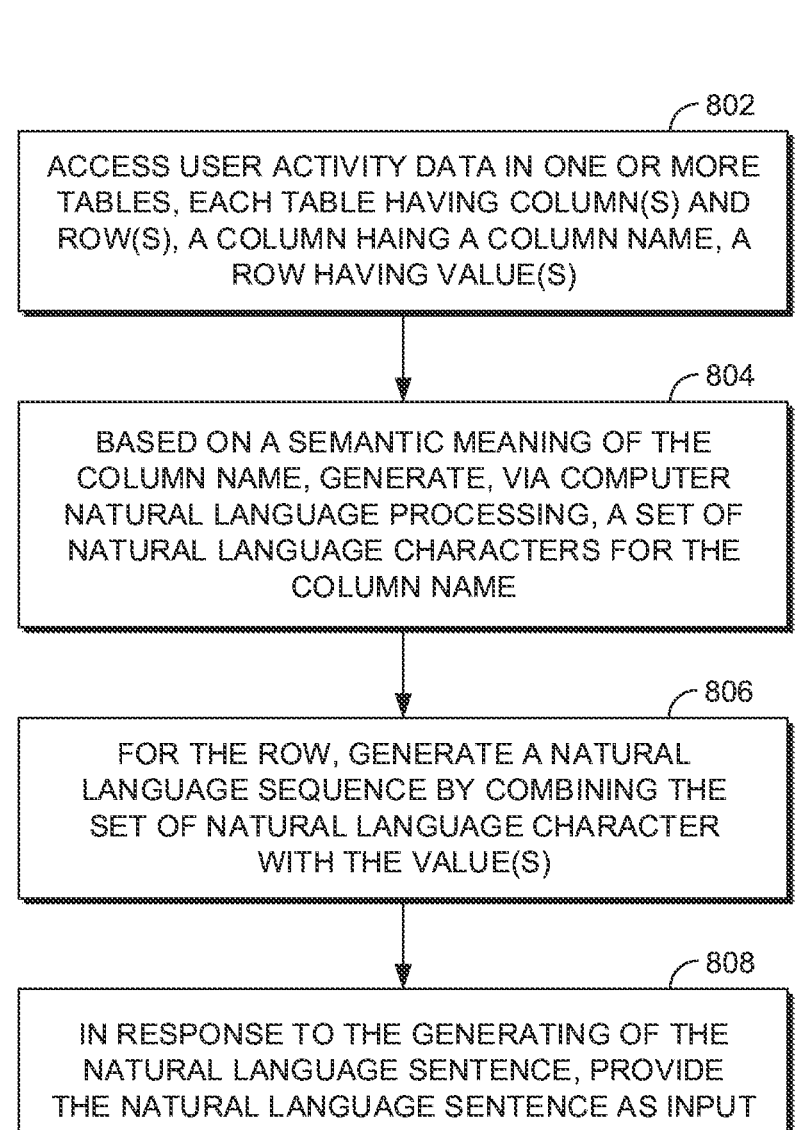

802

ACCESS USER ACTIVITY DATA IN ONE OR MORE TABLES, EACH TABLE HAVING COLUMN(S) AND ROW(S), A COLUMN HAING A COLUMN NAME, A ROW HAVING VALUE(S)

804

BASED ON A SEMANTIC MEANING OF THE COLUMN NAME, GENERATE, VIA COMPUTER NATURAL LANGUAGE PROCESSING, A SET OF NATURAL LANGUAGE CHARACTERS FOR THE COLUMN NAME

806

FOR THE ROW, GENERATE A NATURAL LANGUAGE SEQUENCE BY COMBINING THE SET OF NATURAL LANGUAGE CHARACTER WITH THE VALUE(S)

808

IN RESPONSE TO THE GENERATING OF THE NATURAL LANGUAGE SENTENCE, PROVIDE THE NATURAL LANGUAGE SENTENCE AS INPUT INTO A LANGUAGE MODEL, WHEREIN THE LANGUAGE MODEL OUTPUTS AT LEAST ONE SUMMARY ASSOCIATED WITH THE ROW

*FIG. 8*

900
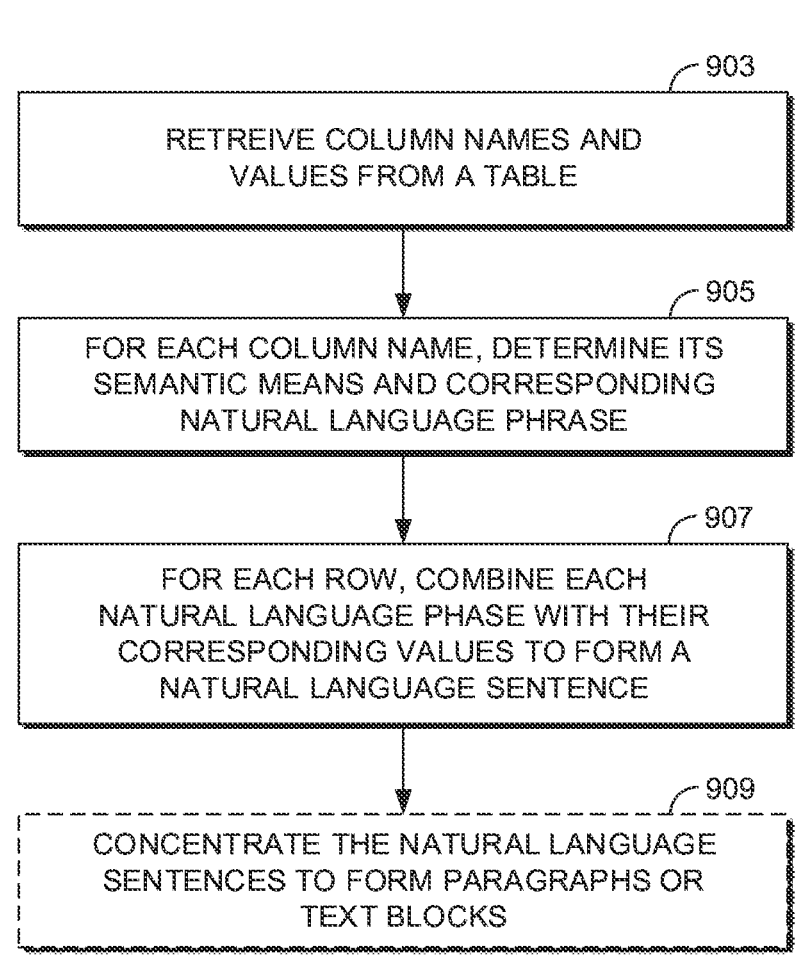
903
RETREIVE COLUMN NAMES AND
VALUES FROM A TABLE
905
FOR EACH COLUMN NAME, DETERMINE ITS
SEMANTIC MEANS AND CORRESPONDING
NATURAL LANGUAGE PHRASE
907
FOR EACH ROW, COMBINE EACH
NATURAL LANGUAGE PHASE WITH THEIR
CORRESPONDING VALUES TO FORM A
NATURAL LANGUAGE SENTENCE
909
CONCENTRATE THE NATURAL LANGUAGE
SENTENCES TO FORM PARAGRAPHS OR
TEXT BLOCKS
*FIG. 9*

1000

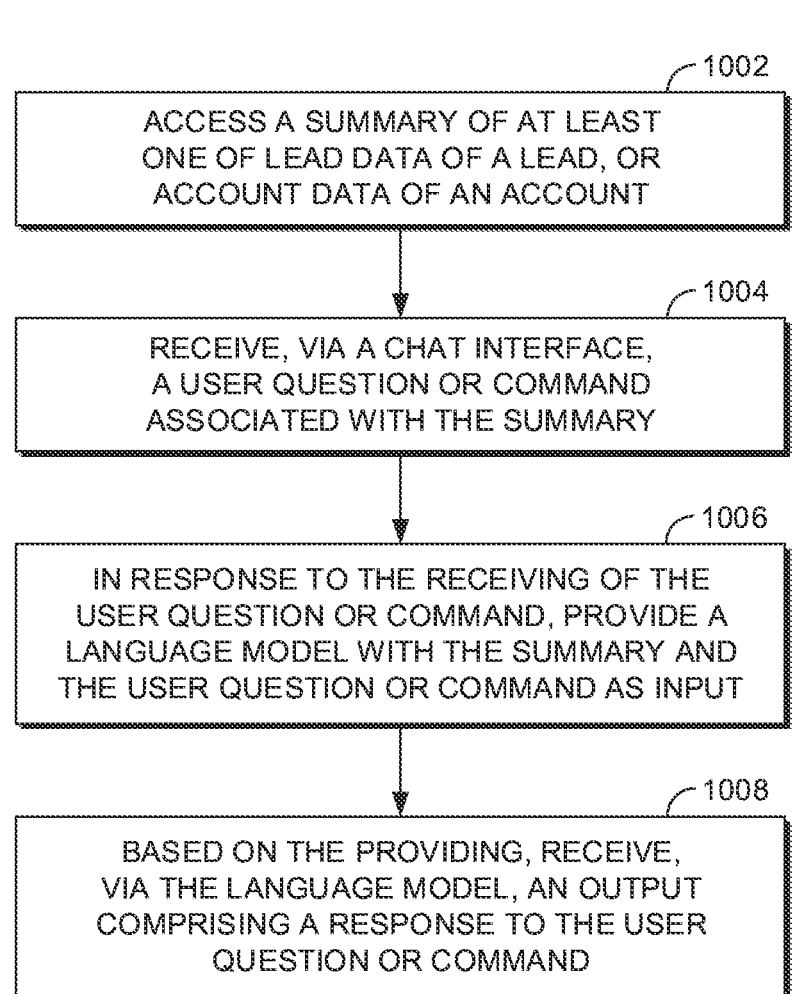

1002

ACCESS A SUMMARY OF AT LEAST
ONE OF LEAD DATA OF A LEAD, OR
ACCOUNT DATA OF AN ACCOUNT

1004

RECEIVE, VIA A CHAT INTERFACE,
A USER QUESTION OR COMMAND
ASSOCIATED WITH THE SUMMARY

1006

IN RESPONSE TO THE RECEIVING OF THE
USER QUESTION OR COMMAND, PROVIDE A
LANGUAGE MODEL WITH THE SUMMARY AND
THE USER QUESTION OR COMMAND AS INPUT

1008

BASED ON THE PROVIDING, RECEIVE,
VIA THE LANGUAGE MODEL, AN OUTPUT
COMPRISING A RESPONSE TO THE USER
QUESTION OR COMMAND

*FIG. 10*

1100
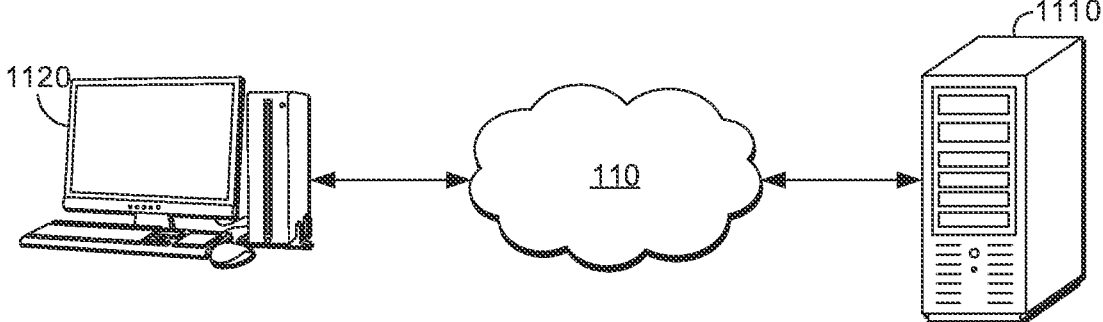
*FIG. 11*

COMPUTER NETWORK ACTIVITY SUMMARIZER AND CHAT INTERFACE

BACKGROUND

Digital marketing relies on computer functionality and computer network channels (e.g., chat, web, or SMS text) to promote a product or service. For example, a user browsing a web application of a publisher (e.g., a host website) can issue a query using particular key words. A cookie at a web browser, a device fingerprint of the user's device, or other mechanism can be used to help network advertiser code associate the key words to the user and provide a bid associated with the key words to the publisher over a computer network. After network communications between the network advertiser code and publisher are made to accept the bid, the publisher's website can cause display of an advertisement at the user device. These and other existing digital marketing technologies have many technical deficiencies, particularly in terms of machine learning capabilities, user interfaces, computer input/output (I/O), and the like.

SUMMARY

One or more embodiments described herein are directed to deriving, via a language model, a summary of data (e.g., account and/or lead data) by converting or encoding table data into one or more natural language sentences, which are then used as input to the language model for generating the summary. One or more embodiments are additionally or alternatively directed to deriving, via a language model, a response to a user question or command via a chat interface by providing the language model with the generated summary as input. In this way, for example, the language model can use the summary as a prompt or other target context for providing a response.

One technical advantage of deriving the summary is accuracy in extracting and analyzing data from tables. That is, particular embodiments can perform natural language processing on tables regardless of the short and discrete natural language characters that tables employ, which do not offer a lot of context for typical natural language processing technologies. Existing NLP models are typically trained or fine-tuned for encoding free-forming natural language text based on training on books, letters, or the like, which have many sequential natural language sentences and paragraphs. Long Short Term Memory (LSTM) models, for example, use prior sequential context of natural language words to predict the next word, which would be nearly impossible to do with table data.

Another technical advantage of deriving the summary and deriving the response to a user question or command via a chat interface is the improvement of existing user interface features and the user experience. This is because various embodiments implement the technical solution of generating summaries of data on a single page and/or implement the technical solution of providing responses to user questions via a chat interface. In this way, user interfaces do not require extensive manual user input, such as drilling, paging, and selecting different tabs to locate different tables and analyze different sets of information (which also reduces computer input/output), which are required by existing user interfaces.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 8 is a flow diagram of an example process for generating at least one summary associated with a row of a table, according to some embodiments.

FIG. 9 is a flow diagram of an example process for verbalizing columns names and row values of a table, according to some embodiments.

FIG. 10 is a flow diagram of an example process for receiving a response to a user question or command, according to some embodiments.

FIG. 11 is an example computer environment in which aspects of the present disclosure are employed, according to some embodiments.

DETAILED DESCRIPTION

Overview

Figure 1:
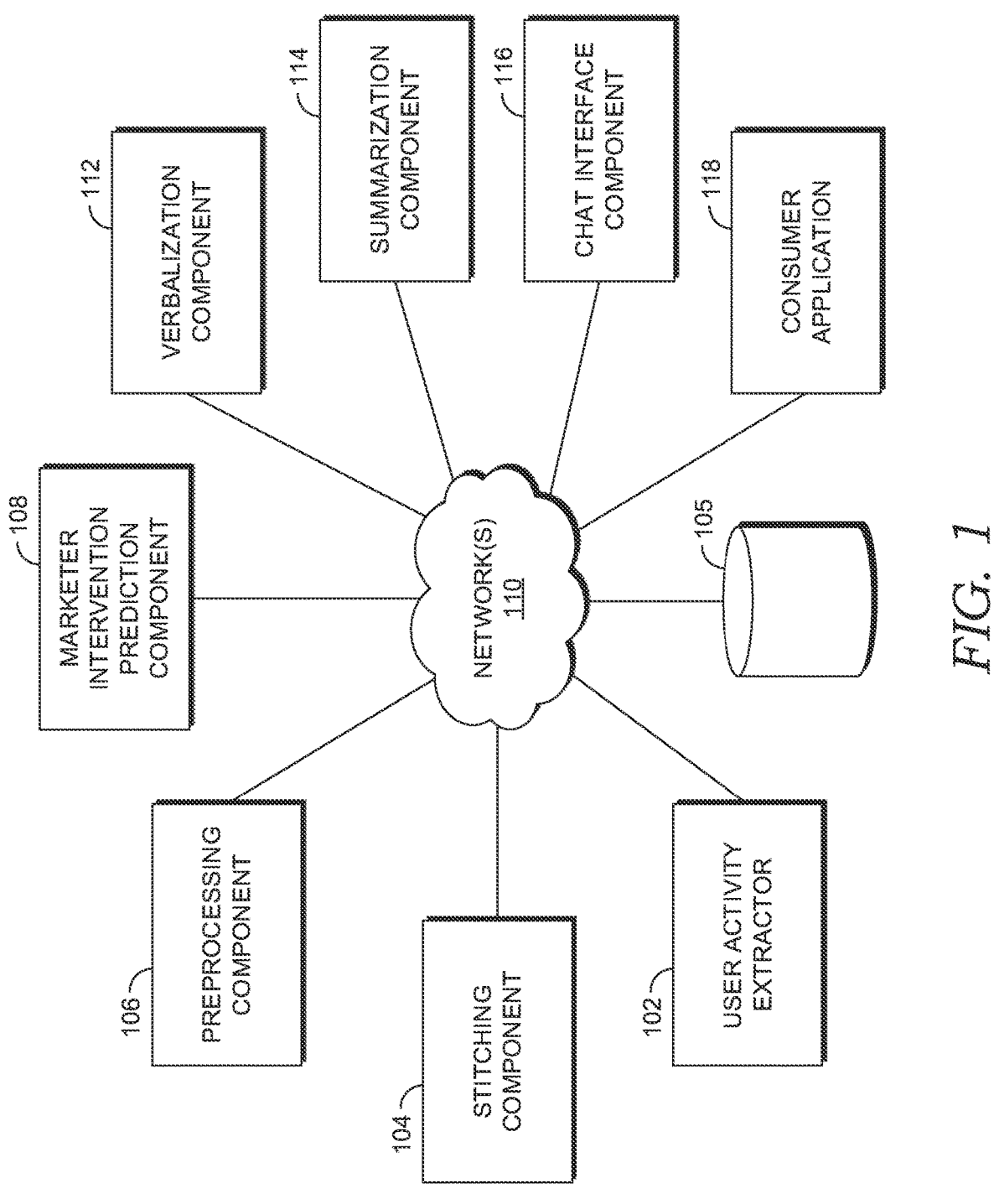
FIG. 1 is a block diagram of a computing system architecture in which aspects of the present disclosure are employed, according to some embodiments.

Various digital marketing technologies are responsible for managing and optimizing user experiences for numerous users. This requires these technologies to decode large volumes of user activity data (e.g., clicks, views, purchases, etc.) to understand user behavior, evaluate the performance of various campaigns, and/or identify high value users for further engagement.

Existing digital marketing and machine learning technologies have many technical deficiencies. For example, existing machine learning models cannot (or are inaccurate in) extracting and analyzing data from tables. Most digital marketing technologies store the user activity data and other data in tables, but that data is often needed to make predictions or other downstream analyses. Neural semantic parser models, for example, attempt to learn joint representation of natural language text and the structured schema of database tables. These models are tailored for specific table comprehension tasks like semantic parsing for access to databases, and converting a natural language utterance (e.g., "what is the average salary of employees in each department?") into a structured query over database tables ("SELECT department, AVG (salary) FROM employees GROUP BY department"). However, there are several technical deficiencies to these approaches. First, information stored in database tables exhibit a strong underlying structure, thereby making any natural language text to be short and discrete and therefore inhibiting any free-forming natural language text to be stored therein. Existing language models, however, are solely trained or fine-tuned for encoding free-forming natural language text of many characters. For example, language models may be trained on books, web pages, letters, or other documents that have many natural language sentences or paragraphs. However, for example, a table may contain one word in each column, where each word is unrelated and many values may be numbers, thereby making any natural language processing inaccurate or impossible. Recurrent Neural Networks (RNN), such as Long Short Term Memory (LSTM) models, for example, use prior sequential context of natural language words to predict the next word, which would be nearly impossible to do with tabular data. Secondly, a database table could potentially have a large quantity of rows (e.g., thousands), and naively encoding all of them using a resource-heavy language model with token input constraints would be infeasible.

Moreover many existing machine learning models of existing marketing technologies have been employed to segment customers, predict customer behavior, and discover relationships between marketing activities and customer responses. However, these machine learning models typically require extensive data preprocessing, and the output of these techniques is not typically presented in a human-readable format, thereby limiting their usefulness for decision-making.

Existing user interfaces of these digital marketing technologies are also problematic in terms of user interface features and the user experience. Various data visualization and report tools have been developed to help marketer users visualize and understand tabular data (i.e., data stored to tables). User activity data is typically stored and presented in many tables. These tools provide interactive dashboards and reports, allowing marketer users to explore the data from different perspectives. While these tools offers some level of interactivity, they still require extensive manual user input, such as drilling, paging, and selecting different tabs to locate different tables and analyze different sets of information. For example, to determine the role of a person (e.g., a lead), the user must drill down, from a first page to a second page that contains a first table. In order to see what computer user activity the person performed and the timestamp, the user must then drill down to a third page from the second page that contains a second table. The user must then typically manually interpret the user activity data. Not only is tabular data challenging to comprehend, tabular data makes it difficult for marketer users to identify trends, patterns, or anomalies that could inform marketing strategies. From the user interface perspective, this is a technical problem because the computing system must then execute additional user clicks, queries, drilling, or other user input to make sense of the data. For example, the user may have to drill down several application pages and tables to finally manually locate a particular row of interest in a table. The user must then copy and paste the data in the table to a spreadsheet application and then make additional selections so that the computing device can perform a mathematical operation on the data, such as computing average quantity of clicks of a website. This is an excessive quantity of computer user input.

Such excessive computer user input is not only arduous and tedious for the user, it causes unnecessary computer I/O. Excessive computer input leads to I/O costs (e.g., excess physical read/write head movements on non-volatile disk) because each time an operating system or other component processes a user request to view or calculate user activity or other marketing data in tables, the user device has to reach out to the storage device to perform a read or write operation, which is expensive because it is error prone and wears on storage components. Read/write heads, for example, are very mechanical in nature and subject to information access errors because of the precise movements they must make when locating sectors, tracks, or addresses. Such errors are more likely to occur when there is excessive computer I/O. Moreover, each repetitive input also requires the data to be saved to memory, thereby unnecessarily consuming storage space.

The present disclosure provides one or more technical solutions that have technical effects in light of these technical problems, as well as other problems, as described herein. Various embodiments are directed to deriving, via a language model, a summary of data (e.g., account level and lead level data) by converting or encoding tabular data into one or more natural language sentences, which are then used as input to the language model for generating the summary. Some embodiments are additionally or alternatively directed to deriving, via a language model, a response to a user question or command via a chat interface by, for example, providing the language model with the generated summary as input. In this way, for example, the language model can use the summary as a prompt or other target context for providing a response.

In operation, particular embodiments first access, from memory, user activity data (e.g., quantity of clicks, quantity of views, quantity of purchases) in one or more tables. Each table may contain one or more columns and one or more rows. Each column may have a column name. Based on a semantic meaning of the column name, particular embodiments generate, via natural language processing, a set of natural language characters for the column name. For example, a table may contain three columns with the column names "name," "age," and "occupation" respectively. Using Named Entity Recognition (NER), particular embodiments, for example, may generate a tag that states: [name: name of a person], which indicates that column name "name" refers to a "name" entity and "person" entity—i.e., a name of a person. Such functionality can additionally or alternatively occur for the other column names, such as [age: age of a person] and [occupation: type of work of a person].

One or more rows of the one or more tables contain one or more values. For example, using the illustration above, a first row (corresponding to a record of a particular user, Joseph) may contain respective values of "Joseph" under the column name, "30" under the age column, and "attorney" under the occupation column. Accordingly, for example, for the first row, particular embodiments generate a natural language sentence by combining the natural language characters with the values. For example, using the illustration above, particular embodiments generate the following natural language sentence, "a person with the name of Joseph of age 30 has the occupation of attorney." In this example, the entity tag "person" has been combined with the original column name "name" and row value of "Joseph," along with other natural language fillers, such as "with the" and "has the" to formulate a complete natural language sentence.

Particular embodiments then provide the natural language sentence as input into a language model, where the language model outputs at least one summary associated with the row based on the natural language sentence. For example, using the illustration above, a Large Language Model (LLM), such as GPT-4, may for example, generate a summary of all the information in the first row (and/or one or more other rows), which may be an essential reformatting of the natural language sentence, such as "Joseph, age 30, is an attorney." A "summary" or text summarization as described herein is the process of breaking down text (e.g., several paragraphs) into smaller text (e.g., one natural language sentence or paragraph). In other words, text summarization is the process of distilling the most important information from a source (or sources) to produce an abridged version for a particular user (or users) and task (or tasks). This method extracts vital information while also preserving the meaning of the text. This reduces the time required for grasping lengthy pieces such as many tables of information without losing vital information.

Some embodiments additionally or alternatively receive a user question or command via a chat interface. In response to receiving the user question, particular embodiments provide a language model with the summary as input. And based on the providing, some embodiments receive an output comprising a response to the user question or command. For example, the language model may use the summary as an input prompt or target document such that the language model searches for the response in the summary. For instance, a user may provide the command, "give me the occupations of all users that are 30 years of age." In this example, the language model may search for an "age" and other strings in the summary and then map the corresponding "30" values to an occupation, such as "attorney" and then provide an output list of each occupation that each 30 year old has in response to the user command.

Particular embodiments described herein improve existing machine learning models and marketing technologies because they have the technical effect of accuracy in extracting and analyzing data from tables. That is, particular embodiments can process tables regardless of the short and discrete natural language characters that tables employ, which do not offer a lot of context for typical natural language processing technologies. This is because particular embodiments verbalize entities in tables, which means that embodiments understand natural language entities and the relationships between the entities or columns and row values. That is, some technical solutions are that particular embodiments determine a semantic meaning of a column name to generate a set of natural language characters for the column name (a first technical solution) and generate one or more natural language sentences by combining the set of natural language characters with one or more values in one or more rows (a second technical solution), as described herein. In this way, embodiments are fine-tuned, prompt-tuned, or prompt-engineered to understand column names and row values and generate additional natural language characters therefrom. For example, in the fine-tuning phase, particular embodiments can replace a training layer trained via Next Sentence Prediction (NSP) or Masked Language Modeling (MLM) to fill in the "gaps" of various training tables between column names and row values in order to formulate complete natural language sentences for the tables. This is unlike existing models that solely trained or fine-tuned for encoding free-forming natural language text based on training on books, letters, and the like. In this way, for example, LSTMs may have the prior sequential context of natural language words they need to predict the next word.

As described above, a database table could potentially have a large quantity of rows (e.g., thousands), and naively encoding all of them using a resource-heavy language model with token input constraints would be infeasible. However, particular embodiments only process lead data of leads and/or account data of accounts. A "lead" is a member (e.g., a customer) of an account. There are typically multiple leads for an account. An "account" describes a group or category that one or more leads belong to, such as an organization (e.g., a corporation), a buying group, or industry. One technical solution is encoding or otherwise only taking into consideration a role of each lead, user activity data of each lead, opportunity stage and type of each lead (e.g., a lead has placed an item in a shopping cart), and advertising campaign that was used for a lead, an account name, account industry, revenue amount of each account, and/or number of employees of each account. Any other data (in columns and rows) can be disregarded so that a model's input size constraints can be met.

Various embodiments also have the technical effect of reduced computing latency relative to existing machine learning models. This is because various embodiments do not require extensive data preprocessing. Rather, particular embodiments only clean the data (e.g., via handling missing values, removing duplicates), normalize, transform the data types, and select relevant features and attributes. However, various embodiments do not perform additional preprocessing steps (e.g., data wrangling or data munging). Accordingly, particular embodiments reduce the network latency to derive inferences or predictions of the language model. Moreover, unlike existing technologies, particular embodiments present the machine learning output in a human-readable format. For example, one technical solution is the generation of a summary in natural language, which summarizes key marketing (e.g., lead and account) features. Another solution is providing a response to a user question or command via a chat interface, which existing models do not do.

Particular embodiments also improve existing user interface features and the user experience of existing technologies. This is because various embodiments implement the technical solution of generating summaries of data on a single page and/or implement the technical solution of providing responses to user questions via a chat interface. In this way, user interfaces do not require extensive manual user input, such as drilling, paging, and selecting different tabs to locate different tables and analyze different sets of information. For example, using the illustration above, particular embodiments can generate, at a single page (e.g., a landing page), a summary that includes the role of a lead, as well as all their user activity data. This is unlike existing technologies which require drilling down from a first page to a second page that contains a first table of a person's role, and then drilling down to a third page from the second page that contains a second table to derive user activity data of the person.

From the user interface perspective, such summary and response to user questions or commands are technical solutions because the computing system executes fewer user clicks, queries, drilling, or other user input to make sense of the data. This is less arduous for users and increases user navigation speed at the user interface. For example, using the illustration above, instead of the user having to drill down several application pages and tables to finally manu- ally locate a particular row of interest in a table, the user may simply ask where the particular row is and an answer may be surfaced via the chat interface. Alternatively, the user may view such information in the summary, which improves user navigation speed. In another example, instead of the user copying and pasting the data in the table to a spreadsheet application and then making additional selections so that the computing device can perform a mathematical operation on the data (e.g., computing average quantity of clicks of a website), some embodiments perform such mathematical operation or other predictions automatically via a machine learning model. For example, one technical solution is the generation of one or more scores indicative of: an indication of an account or lead that should be sent a digital marketing advertisement, a particular campaign to use for the digital marketing advertisement, and a particular channel and time to provide the digital marketing advertisement.

Various embodiments also improve computer I/O because these embodiments reduce excessive computer user input. The technical solutions of the outputting a summary and/or providing a response to a user question or command reduces I/O because, as described above, the user does not have to perform additional drilling, paging, or other user input to find the data they are looking for. In this way, the user device has to reach out to the storage device to perform a read or write operation fewer times, which is less expensive because it is less error prone and wears on storage components less. Read/write heads, for example, are less likely to make information access errors on storage devices because there is not excessive I/O that wears on the read/write heads during a short time span. Further, memory consumption is reduced because less computer user input is saved to memory, thereby consuming less storage space.

Various embodiments also have the technical effect of increased data security or privacy. For example, language models can hallucinate by generating sensitive personal information (e.g., a credit card number, a phone number, an email address, and a physical address) that is inadvertently derived from a training dataset, examples, or tables. Such generation of this sensitive or personal information can be considered a type of hallucination because the model gen- erates output text that is not "faithful" to the source input. For example, a user may issue a request to generate a summary of a lead's user activity data, which inadvertently contains a credit card number that was input by a user. However, the model may inadvertently include the credit card number as part of the summary. One technical solution to increase data security or privacy is that some embodi- ments anonymize all personally identifiable information (or other sensitive information) in the user activity or other data. For example, the sensitive information can be encrypted, deleted, masked, or obfuscated while the non-sensitive information remains. In yet another example of a technical solution, particular embodiments train (or fine-tune) a lan- guage model based on learning likelihood of sensitive data (e.g., by learning what a phone number, address, or credit card number looks like) so that those data in tables or natural language sentences are always anonymized.

Exemplary System

Referring now to FIG. 1, a block diagram is provided showing aspects of an example computing system architec- ture suitable for implementing an embodiment of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1200 of FIG. 12). Alternatively, some or each of the components may be distributed among various computing devices, such as in a distributed cloud computing environment. In some embodiments, the system 100 and each of the components are located within the server and/or user device of FIG. 11, as described in more detail herein.

The system 100 includes network 110, which is described in connection to FIG. 11, and which communicatively couples components of system 100, including a user activity extractor 102, a stitching component 104, a preprocessing component 106, a marketer intervention prediction compo- nent 108, a verbalization component 112, a summarization component 114, a chat interface component 116, a consumer application 118, and storage 105. The components of the system 100 may be embodied as a set of compiled computer instructions or functions, program modules, computer soft- ware services, logic gates, hardware circuitry (e.g., an AI accelerator, such as at a GPU), or an arrangement of processes carried out on one or more computer systems.

The system 100 generally operates to generate a summary of marketing data as well as execute chat commands or questions. The user activity extractor 102 is generally responsible for extracting and/or generating user activity data. "User activity data" refers to indications of any suitable computer user input (e.g., a log record of a user interface task engaged in) and/or statistics associated with such com- puter user input (e.g., a quantity of different types of user input). In some embodiments, user activity data additionally includes any other suitable marketing data, such as name of leads, name of accounts, or other demographic data. In an illustrative example, user activity data can be the amount of clicks, amount of views of a web page, the time spent on each web page, the UI features selected, indications of how many items were placed in shopping carts, all the strings the user typed, or the like for one or more users. Such user activity data can, for example, be any lead activity data and/or account level data. Such information can be extracted or accessed in any suitable data store (e.g., a database) or data structure. The user activity extractor 102, for example, can access, from multiple tables in a database, historical user activity data that was input by users prior to the request to access such data.

In some embodiments, the user activity extractor 102 additionally or alternatively tracks user activity and gener- ates corresponding data structures, such as log records or statistics in multiple tables. For example, particular embodi- ments can use a cookie at a web browser (to track the specific user activity) a device fingerprint, a geocoded indicator (e.g., a GPS location), and/or IP address of a user device (to track device ID of corresponding user device) and populate a data structure (e.g., relational database tables) in near real-time. For example, in response to a user clicking on a button (or otherwise interacting) with a web or app page, particular embodiments responsively populate or increment, in near real-time, corresponding user activity data in a log, a hash map, and/or a database under the appropriate table and column (e.g., "clicks") for the given user or record. For example, the user activity extractor 102 can increment, via counter logic, the quantity of clicks by 1 in a database table. Responsively, such information is stored to memory. Later, such data structure can be accessed or extracted in memory for further analysis, as described in more detail below.

The stitching component 104 is generally responsible for stitching each data structure together that holds the user activity data generated or accessed by the user activity extractor 102 (e.g., via a programmatic call from the stitching component 104 to the user activity extractor 102). Data stitching is the process of combining different sets of related data into one common destination. There, the data can be merged, aggregated, summarized, and processed in any suitable manner. For example, different database tables can be merged or a "join" can be performed. JOINS in SQL, for example, are commands which are used to combine rows (and/or columns) from two or more tables (e.g., a table from a lead database and a table from an account database), based on a related column between those tables. In yet another example, data from different external resources can be combined. For example, using Extract Transform Load (ETL), particular embodiments can extract information from a first host database server (corresponding to a social media service), a second host database server (corresponding to a banking service), and/or an API of a maps provider.

In these embodiments, for example, particular embodiments can establish a network protocol (e.g., TCP/IP, SYN, ACK, SYN-ACK) communication session between each data source to open up a communication channel or link and send appropriate packets for deriving the needed information. ETL refers to the concept of pulling (or copying) data from one or more source databases (e.g., data storage 105 which contains the user activity data) and writing the pulled data into a target data store with another format. Specifically, for the "Extract" operation, data (e.g., raw data) is extracted or read from one or more data sources. For the "Transform" operation, the read data is converted from its previous form (e.g., raw form) into the form it needs to be in so that it can be placed in another databxase. Transform occurs by using lookup tables, one or more rules, or combining the read data with other data. In an illustrative example of the Transform operation, the Transform operation can additionally clean, sort, validate, and/or prepare the read data. For the "Load" operation, the transformed data from the "Transform" operation is then written into a target data store.

The preprocessing component 106 preprocesses the data combined by the stitching component 104. Preprocessing data is indicative of modifying or reformatting the data in some way for downstream processing. For example, the preprocessing component 106 can programmatically call the stitching component 104 so that the stitching component 104 returns the stitched database tables to the preprocessing component 106. The preprocessing component 106 then cleans the data (e.g., handles missing values, zero values, removes duplicates), normalizes the data, transforms data types, and selects relevant features and attributes (e.g., columns) and stores them to storage 105 (and excludes selecting other features and storing in storage 105). In some embodiments, preprocessing includes the "Transform" step described above with respect to ETL. In some embodiments, the preprocessing component 106 anonymizes all personally identifiable information. For example, the preprocessing component may encrypt, mask, obfuscate, or delete any database row values under a "name" column, "credit card," column, "phone number" column, or any other identifiable information.

The marketer intervention prediction component 108 is generally responsible for generating one or more scores or decision statistics (e.g., a softmax probability score), indicative of one or more predictions associated with the preprocessed data. For example, the marketer intervention prediction component 108 can programmatically call the preprocessing component 106 and the preprocessing component 106 may return preprocessed data tables of user activity data. The marketer intervention prediction component 108 may then provide, as input, such data to a machine learning model (e.g., a classifier or regression neural network) to make one or more predictions, such as what lead should be engaged, what campaign should be used, and/or the appropriate channel (e.g., email, SMS text, or retargeting on web page) to be used. For example, a neural network can be trained on various historical user activity data that has been labeled or annotated as a converted customer or account. The neural network can then detect patterns and associations regarding the features of the training data. For example, the neural network can determine that all customers with demographic data X (e.g., age, gender, socioeconomic status) that are shown campaign Y eventually converted to a product. Accordingly, for a new data point (e.g., received user activity data for a lead after the neural network has been trained), which is a lead (not a converted customer) with demographic data X, the neural network may generate a probability score prediction that campaign Y is the best campaign to surface to the lead based on the training data.

The verbalization component 112 is generally responsible for taking, as input, the preprocessed data structures (e.g., tables) of the user activity data from the preprocessing component 106, the predictions made by the intervention prediction component 108, and/or other marketing data and generating natural language sentence sentences or phrases from column names and values in the data structures. Verbalization thus maps tabular data into a more human-readable format. For example, some embodiments receive column names and values from the tables. Then, for each column name, the verbalization component 112 determines its semantic meaning and corresponding natural language phrase. This may include using any suitable form of natural language processing (NLP).

Computational linguistics, also known as Natural Language Processing (NLP), is a computer-based technique to understand, learn, and/or produce natural human language content. Recent advances in NLP technologies use sophisticated machine learning models or other techniques to derive a rich understanding of linguistics. For example, some models: engage in preprocessing pipelines via Part-of-Speech (POS) tagging (with tags such as noun, verb, and preposition), tokenize and parse sentences into their grammatical structures, perform lemmatization, stemming, and the like for syntactic, semantic, or sentiment analysis. Stemming is the process of removing suffixes from words to create a "root" word. For example, the words "likes", "likely" and "liked" all result in the common root "like", which can be used as a synonym for all three words. In this way, an NLP model can learn that all three words are somehow similar and are used in a similar context. Stemming allows us to standardize words to their base stem regardless of their inflections, which is useful in many applications such as clustering or text classification. Lemmatization groups different inflected forms of a word so they can be analyzed as a single item. For example, the word "better" can be grouped to "like" and the word "worse" can be grouped into "bad" in order to derive semantic meaning. Some embodiments additionally or alternatively use Semantic analysis, which analyzes the grammatical format of sentences, including the arrangement of words, phrases, and clauses, to determine relationships between independent terms in a specific context to determine the ultimate meaning of a word. For example, the term "Apple" may be determined to be a brand, as opposed to a fruit based on the context of the surrounding words and its punctuation—"I bought an Apple instead of a Samsung today."

In some embodiments, the corresponding natural language phrase is performed via Named Entity Recognition (NER). NER is an information extraction technique that identifies and classifies tokens/words or "entities" in natural language text into predefined categories. Such predefined categories may be indicated in corresponding tags or labels. Entities can be, for example, names of people, specific organizations, specific locations, specific times, specific quantities, specific monetary price values, specific percentages, specific pages, and the like. Likewise, the corresponding tags or labels can be specific people, organizations, location," time, price (or other invoice data) and the like.

NER can take a table as input and tag each column (i.e., an entity) with additional text. For example, the verbalization component 112 can tag a "name" column as a "name entity," indicative that the column name refers to a person's name and also tag a "click" column as a "click user activity" entity, indicative that the particular type of user activity data refers to clicks. The verbalization component then combines the natural language phrases for each column in one or more tables with their corresponding values to form a sentence. For example, using the illustration above, the verbalization component 112 can combine the two phrases "person entity: name of Joe performed user activity of 10 clicks." In some embodiments, this is repeated for each row in one or more tables to generate multiple sentences (which may be included in a summary). Alternatively or additionally, the verbalization component 112 concatenates sentences to form paragraphs or longer text blocks.

The summarization component 114 is responsible for generating (or receiving) a summary of one or more aspects of the marketing data or user activity data verbalized via the verbalization component 112. In other words, for example, the summarization component 114 takes, as input, the verbalized sentences from 112 to derive a summary. For example, the summarization component 114 can summarize the user activity data and other marketing data of a particular lead, set of leads, accounts, or set of accounts. In an illustrative example, the summarization component 114 can represent or use a Large Language Model (e.g., BERT) to summarize a natural language sentence describing row of a particular lead's user activity data and other data. For example, using the illustration above, the sentence "person entity name of Joe performed user activity of 10 clicks" can be summarized as "the lead Joe performed 10 clicks . . . you should present Joe with X campaign (e.g., as predicted by the marketer intervention production component 108). The details of such model are described in more detail below.

The chat interface component 116 is generally responsible for predicting, generating, or providing one or more natural language responses in response to a user question, command, or other prompt that is also in natural language. In some embodiments, the chat interface component 116 is or uses another large language model (e.g., a GPT-3) trained to provide correct responses (e.g., answers) to user commands or questions, such as via prompt engineering as described in more detail below.

The consumer application 118 generally refers to a computer application or services, such as online/cloud applications or locally stored applications that consume or utilize the computer objects or computer resources determined by system 100. Examples of consumer applications may include, without limitation, computer applications or services for facilitating marketing analytics, meetings or communications; email, messaging, chat, or calling; project management; and/or calendaring or scheduling, or the like. In some embodiments, the consumer application 118 employs user interface functionality for producing the summary output by the summarization component 114 and/or responses generated by the chat interface component 116.

The storage 105 represents and suitable data store, such as a database, storage device (e.g., RAM or disk drive), and/or a storage system (e.g., a Storage Area Network (SAN) or RAID). The storage 105 can include any suitable data, such as training data, user activity data, marketing data, verbalized data, summarized data, or the like.

Figure 2:
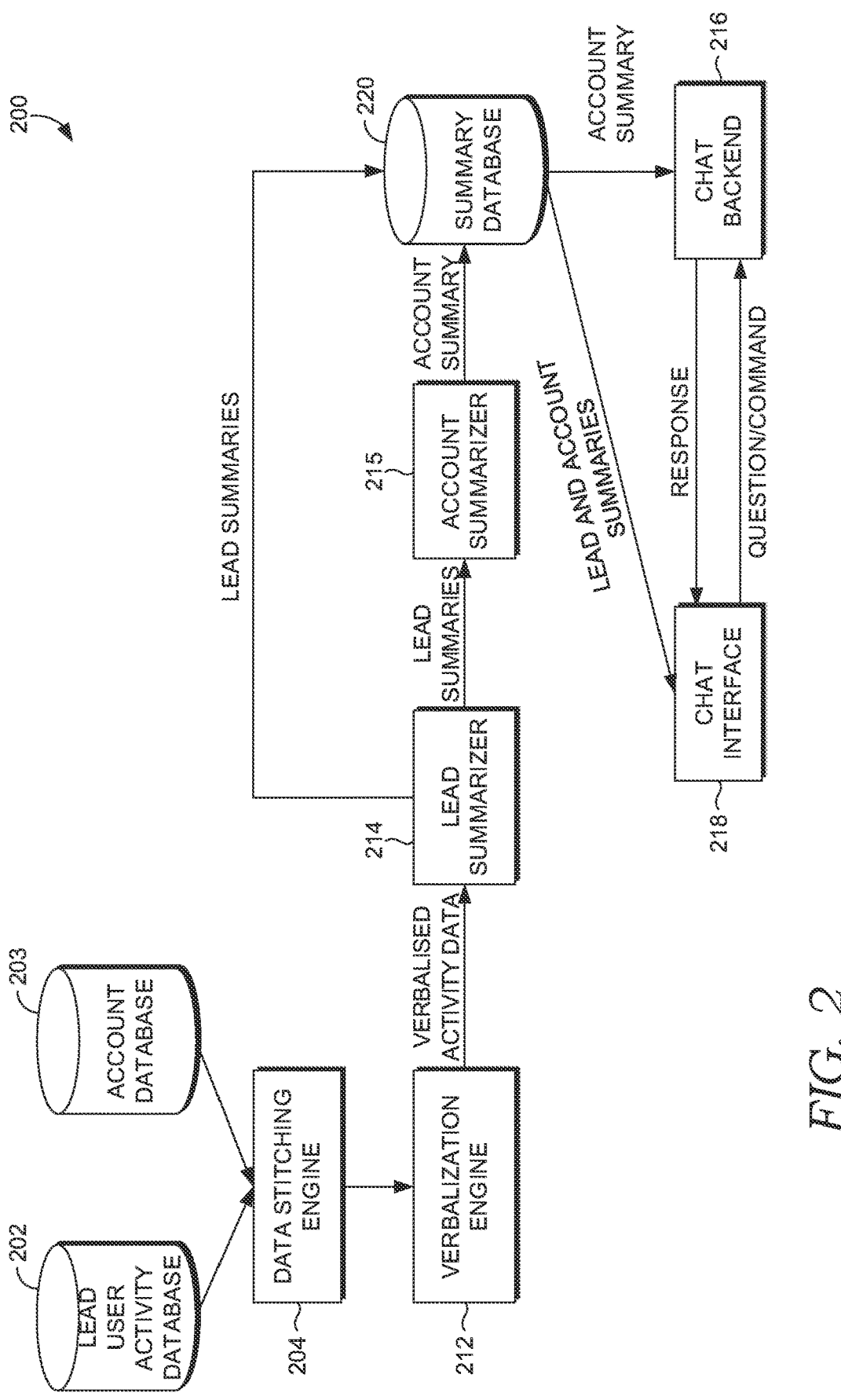
FIG. 2 is a block diagram of a computing system architecture illustrating how a summary is generated and how chat responses are formulated, according to some embodiments.

FIG. 2 is a block diagram of a computing system architecture 200 illustrating how a summary is generated and how chat responses are formulated, according to some embodiments. In some embodiments, one or more of the components of the system 200 represent one or more of the components of the system 100 of FIG. 1. For example, in some embodiments, the data stitching engine 204 represents the stitching component 104, the verbalization engine 212 represents the verbalization component 112, the lead summarizer 214 and account summarizer 215 may both be part of the summarization component 114, the chat backend 216 may represent the chat interface component 116, the chat interface 218 may represent a user interface of the consumer application 118, and/or the user activity database 202, the account database 203, and the Summary database 220 may all be included in storage 105. The system 200 includes several components and processes that work together to efficiently generate natural language summaries of account activities (e.g., in Adobe Marketo Engage) and provide a chat interface for dynamic interaction.

The first step in the process involves extracting (e.g., via the user activity extractor 102) user activity data of one or more leads in the lead user activity database 202 as well as account data of one or more accounts in the account database 203. In some embodiments, the lead user activity database 202 represents ADOBE Marketo Engage. Marketo extracts a huge variety of user activity types related to lead records (i.e., for each lead). Nearly every change, action or flow step is recorded against a lead's user activity log and can be retrieved via a API or leveraged in Smart List and Smart Campaign filters and triggers. User Activities can be related back to the lead record via the lead Id, corresponding to the Id field of the record, and also has a unique id of its own. Marketo permits a huge variety of user activity types related to lead records. Nearly every change, action or flow step (e.g., a switch or UI drill down from a first page to a second page) is recorded against a lead's activity log and can be retrieved via the API or leveraged in Smart List and Smart Campaign filters and triggers. In some embodiments, user activities are related back to the lead record via the lead Id, corresponding to the Id field of the record, and also has a unique id of its own. There are a very large number of potential user activity types, which may vary from user to user, and have unique definitions for each.

The account database 203 lists each account ID and/or related information, such as company name, age, occupation, or other demographic data. For example, in some embodiments, the account database 203 is a Customer Relationship Management (CRM) database that collects and stores every interaction (e.g., user activity data) that a company has with its customers in one place and then makes all of that information available to the company in one customizable dashboard. This means that support agents do not need to log in and out of multiple systems, copying and pasting account numbers into different software tools to get basic information about a customer. With CRM, all of the data created about customers across disparate tools, accounts, and systems is automatically stored in the database and easily accessible to everyone on the team.

The data stitching engine 204 stitches the lead user activity database 202 and the account database 203 at the account level meaning that all user activity data of leads (e.g., employees of a corporation) are consolidate (e.g., via a single table) to their corresponding account (e.g., the corporation) and other account-level data. For example, the data stitching engine 204 build indexes, pointers, or key fields in a data structure that maps user activity data for a given lead to the corresponding account they belong to. In some embodiments, this data originally resides in nine different tables, which are then stitched together and pre-processed for further analysis. Preprocessing may involve cleaning the data (e.g., handling missing values, removing duplicates), normalizing and transforming data types, and selecting relevant features and attributes. In some embodiments, all personally identifiable information in the databases 202 and 203 are removed, and the remaining data is synthesized. In some embodiments, the tables included in the lead user activity database 202 and the account database 203 contain information spanning from account level firmographic data, lead demographic and user activity data, marketing lists the leads belonged to, and their descriptions, as well as lead interactions (user activity) with campaigns/webinars and their corresponding changing behaviors (e.g., scores that indicate a higher ranked lead based on increased user activity of product A). A "marketing list" is a document, file or other data object, where leads share at least one attribute in common. For example, a marketing list can be a list of current or prospective customers located in city Y (the shared attribute) that a business utilizes to increase sales and/or brand awareness. A "campaign" is the strategic steps that an entity makes to promote its product or service. For example, a campaign, may be to send advertisement A via channel B, then send advertisement C via channel D to promote its product for a certain demographic.

Figure 3B:
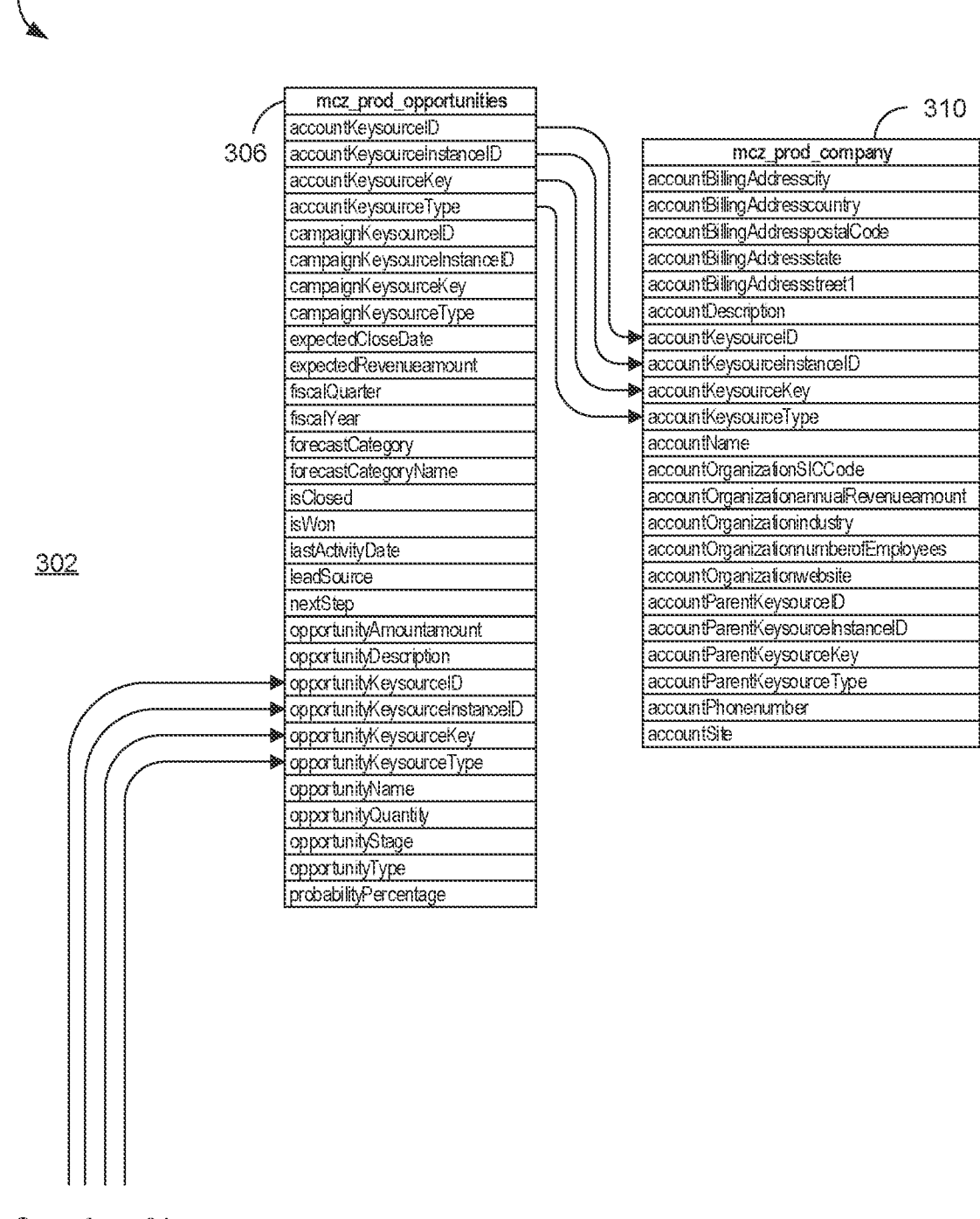
FIG. 3 is an entity relationship diagram of a database table schema illustrating different table columns and how a lead user activity database and account database are merged using common keys, according to some embodiments.

In some embodiments, to prepare the data for summarization, the tables in the lead user activity database 202 and account database 203 are merged using common keys, as illustrated in FIG. 3 This allows the data to be combined and organized to provide lead level demographics and interactions, along with the account level data.

Once the data and predictions are collated (e.g., via the data stitching engine 204 and/or the marketer intervention prediction component 204), it is converted into natural language sentences through a process called verbalization via the verbalization engine 212. This involves mapping the tabular data into a more human-readable format by using a template and generating sentences that describe the user activities of leads, their attributes (e.g., demographic data, such as age, name, and the like), account level information, and the like.

Verbalization is the process of generating natural language sentences from column names and values in tables. It helps to provide a clear and concise understanding of the data by converting it into readable and comprehensible language. These sentences can then be used as context to feed a Large Language Model (LLM) based on which the components can be built. Here are the steps involved in a verbalization strategy in some embodiments: Retrieve the column names and values from the table. For each column name, determine its semantic meaning and corresponding natural language phrase. Combine the natural language phrases with their corresponding values to form a sentence. Repeat for each row in the table to generate multiple sentences. Optionally, concatenate sentences to form paragraphs or longer text blocks. Below are sample verbalized natural language blocks output by the verbalization engine 212 for 5 different interactions of a particular lead:

Interaction 1: 'The lead with person role Technical Buyer is at the opportunity stage Qualified assigned to the marketing list with description Unable to connect to remote host. This lead was engaged in the campaign 01 COMM AEMA having description NA_Adobe: Winning With Superior Customer Experiences_WP_Q119 Adobe Analytics; Adobe Target at the time 2022-11-22T18:212 The response was that the lead opened the email and the lead operation score changed by −15 because of Changed by Smart Campaign Score I Profile.03.PS-FA-Creative-Art-Buyer—EC action Change Score. This lead has now progressed because they Filled out the form'

Interaction 2: 'The lead with person role Technical Buyer is at the opportunity stage Execute to Close assigned to the marketing list with description Unable to connect to remote host. This lead was engaged in the campaign 01 Generic Commerce having description 5.28.19—Adobe Logo on page has no Link at the time 2022-11-22T18:2112 The response was that the lead clicked on a link the email and the lead operation score changed by 33 because of Changed by Smart Campaign Score I Decay Reductions. Reduction Person Unsubscribed action Change Score. This lead has now progressed because Web service API'.

Interaction 3: 'The lead with person role Technical Buyer is at the opportunity stage Execute to Close assigned to the marketing list with description Unable to connect to remote host. This lead was engaged in the campaign 01 COMM AEMS having description NA Adobe: Path to Experience Driven Commerce_WP_Q219\nMagento Commerce at the time 2022-11-22T18:2122The response was that the lead opened the email and the lead operation score changed by −41 because of Changed by Smart Campaign Score I Activity.AES Activity Score—New Logo—EC action Change Data Value. This lead has now progressed because Updated based on webinar attendance report'.

Interaction 4: 'The lead with person role Technical Buyer is at the opportunity stage Execute to Close assigned to the marketing list with description Unable to connect to remote host. This lead was engaged in the campaign 02 AEMA MKTO having description 5.28.19—Adobe Logo on page has no Link at the time 2022-11-22T18:2132The response was that the lead opened the email and the lead operation score changed by −39 because of Changed by Smart Campaign Score I Profile.12.PS-R-SeniorDirector-Director-EMEA—EC action Change Score. This lead has now progressed because Updated based on webinar attendance report'.

Interaction 5: 'The lead with person role Technical Buyer is at the opportunity stage Pre Call Plan assigned to the marketing list with description Unable to connect to remote host. This lead was engaged in the campaign 02 OP-Post-Summit_Screener_EMEA_Western having description NA_Horizontal_Out with the old In with outstanding_WP_Q318\nAdobe Campaigns at the time 2022-11-22T18:2142The response was that the lead did not open the email and the lead operation score changed by 0 because of Changed by Smart Campaign Score I Profile.16.PS-R-SVP-VP—EC action Change Score. This lead has now progressed because Updated based on webinar attendance report and the opportunity is now won (e.g., become converted).'

The verbalized sequential interaction and prediction data converted, via the verbalization engine 212, into human readable sentences are then fed into an LLM model, which generates natural language summaries of activities at both the lead (via the lead summarizer 214) and account levels (via the account summarizer 215). Models characterized as LLMs are advanced language models that have been trained on a vast corpus of text data and can generate coherent and contextually relevant summaries based on the input provided. The model generates summaries by identifying the most important and relevant information from the verbalized data, ensuring that the final output captures the key insights and patterns in a concise and easily digestible format. The prompt is designed in a way to ensure that the model does not hallucinate. In some embodiments, the summary only contains information that is present in the data and is factually correct. Examples of lead summaries generated via the lead summarizer 214 and from one or more LLMs (davinci-003, Stable Vicuna, LLaMA) for the 5 interactions listed above are given below:

Davinci-003: The lead in question has a role of Technical Buyer and belongs to a buying group. They have interacted with five campaigns, such as 01 COMM AEMA, 02 OP-Post-Summit_Screener_EMEA_Western, 01 Generic Commerce, 01 Welcome Controllers, and 02 AEMA MKTO. The lead has responded to emails, clicked on links, and filled out forms, resulting in changes to their lead operation score. The lead opportunities have been won and progressed.

Stable Vicuna: The Technical Buyer, a member of a buying group, has interacted with five campaigns, namely 01 COMM AEMA, 02 OP-Post-Summit_Screener_E-MEA_Western, 01 Generic Commerce, 01 Welcome Controllers, and 02 AEMA MKTO. This engagement has resulted in responsive behavior such as email replies, link clicks, and form completions, consequently increasing their lead operation score. The lead opportunities have been successful and moved forward.

LLAMA: A Technical Buyer holds the lead position and is part of a purchasing consortium. Their engagement spans across five campaigns-01 COMM AEMA, 02 OP-Post-Summit_Screener_EMEA_Western, 01 Generic Commerce, 01 Welcome Controllers, and 02 AEMA MKTO. This lead has displayed interest by responding to emails, clicking on links, and completing forms, thereby elevating their lead operation score. As a result, the lead opportunities have advanced and continued to progress.

Additionally, the account summarizer 215, taking the lead summaries generated by the lead summarizer 214 as input, combines summaries of all leads within an account to generate summaries at an account level. Example input lead summaries of four leads in an account and their corresponding account-level summaries are listed below:

Input lead summary sequences: 1. This lead is a C-level executive in a large organization. They are part of a buying group X and have shown high engagement with three campaigns: A, B, and C. Their scores have increased significantly, indicating a high likelihood of conversion. The lead opportunity is now closed (e.g., did not become a customer).

2. The lead is an Onboarding Contact, and belongs to the buying group. They have shown high engagement with the top 3 campaigns, 02 AEMF to Sign IB, 03 RTCDP MKTO, and 01 Welcome Controllers, resulting in a high change in scores. The lead opportunity is currently won.

3. The lead is a Technical Buyer, and belongs to the buying group X. They have shown high engagement with the top 3 campaigns, 03 OP-Post-Summit_Screener_A-PAC_IND, 01 POI POI, and 02.DNU, resulting in a high change in scores. The lead opportunity is currently won.

4. The lead has a role of Bill To, belongs to the buying group X, and has interacted with five campaigns, with the top three being 00 Attendance Response-Summit Screener EMEA, 01.DNU, and 03 OP-Post-Summit_Screener_Territory. The lead opportunity is currently won.

Described below is an example Account-level summary that combines or summarizes the 4 lead summaries above because they belong to a single account (i.e., the "buying group"): "This account belongs to the technology industry and has a buying group of 3 people with roles of CTO, CFO and CMO. The most successful campaigns have resulted in 3 leads won and 1 closed. The account score is 80, factoring in the lead interactions.

The generated summaries are stored to the summary database 202, accessed from corresponding memory addresses in the summary database 2290, and then used as context to the chat backend 216, which allows marketer users to interact with the data dynamically. When a marketer, for example, asks a question (e.g., sends a voice command or provides user input) through the chat interface 218, the system calls the chat backend 216 (e.g., a compute node with a LLM) with the query and then the chat backend 216 retrieves/accesses the relevant information from the summary database 220 and formulates and provides an appropriate response back to the chat interface 218 in near real-time.

In the context of an account, for instance, a marketer can then ask the chat interface anything to help them with account nurturing—ranging from simple reportative queries to complex ones in the realm of predictive, prescriptive analytics. Some example questions and the chat interface's responses are given below:

Query 1: What kind of campaigns have been successful in the Healthcare industry?

Answer: The most successful campaigns in the Healthcare industry are 00 FY21_MAX Reporting, 01 POI_1 Stream Lists, 01 AEP Stream Lists, 02 MKTO AEMA, 01 COMM AEMS, 01 RTCDP to AA IB, 02 POI_2 Functional Area_1—Stream Lists, 01AMER-US-2019-Q3-EM-Target-WP-OfferID-70110000002bU9LQAU, 01. CRM PromotionlInqCtrl I Operational, 02 OP-Post-Summit_Screener APAC_SEA_HK, 02 AT AA, 03 AEMF+Sign to AEMS IB, 03. NA_Adobe: Adtech & Martech A Guide For The Modern It Pro_Q119 AEM Sites, 01.DNU, 00 Attendance Response—Summit Screener, 02 OP-Post-Summit_Screener_Corporate, 03 WF AEMA, 00 Pretend RTID CNCID, and 01 RTCDP to AA IB.

Query 2: What is the expected revenue amount and close date for the account?

Answer: The expected revenue amount for the account is 363,000.0 and the expected close date is 2023 Oct. 26.

Query 3: What are the roles of the leads in the buying group?

Answer: The roles of the leads in the buying group are Business User, External Partner, ETLA Renewal Contact, Influencer, and Decision Maker.

Query 4: How many leads were won or closed and what is the account score?

Answer: Two leads were won and three leads were closed, resulting in an account score between 50 and 100, factoring in lead interactions.

Query 5: Which campaign should I target the lead with role Decision Maker based on their interaction so far?

Answer: The lead with role Decision Maker has progressed through the stages DiscoveryNalidation, Circle of Influence, Qualification, Solution Definition and Validation. They have responded with past campaigns by opening emails, clicking links, and filling out forms. They are most likely to engage with a campaign with an invitation to a webinar.

FIG. 3 is an entity relationship diagram of a database table schema 300 illustrating different table columns and how a lead user activity database and account database are merged using common keys, according to some embodiments. The database table schema 300 includes multiple database table columns—those columns found in the lead user activity database 302 (e.g., lead user activity database 202), which are columns 312, 314, 304, 306, and 308. The database table schema 300 also includes a database table column 310 that belongs to an account database (e.g., the account database 203).

The column 304 and corresponding table (mczprod opportunities contact roles) contains data on leads identified as opportunities or have completed an opportunity. The corresponding table also provides information on the lead's role in the account and whether they are the primary contact. An "opportunity" is a particular intermediate milestone between user engagement and conversion (e.g., purchasing a product). For example, an opportunity indication may be an indication that a user has placed an item in a shopping basket (the opportunity) but has not purchased the item (the conversion).

The column 306 or corresponding table (mczprod opportunities) contains data on leads identified as opportunities. The corresponding table also provides information on whether the lead is won (e.g., has agreed to purchase a product) or closed (e.g., has not purchased the product), the opportunity stage and type, the lead's last activity date, and the like. An opportunity stage is the particular level or milestone of the opportunity in a continuum of milestones until conversion. For example, a first opportunity stage may be a click of a listing, a second opportunity stage may be after the click when a user has placed an item in a shopping cart, and a third opportunity stage may be when the user fills out billing and shipping details right before conversion.

Column 308 or corresponding table (mczprod activities) contains data on lead interactions. The table provides information on the campaigns that the leads were sent, including campaign name and webpage link, their engagement (i.e., user activity data) in terms of clicking or opening links, the device and browser used for the interaction, and the corresponding score or statistics, changes and explanations.

The column 310 or corresponding table (mcz prod company) contains account-level information, such as account name or ID, industry ID, revenue amount, and number of employees. The columns 312 (mcz prod static list membership) and 314 contains information about which lead belonged to which marketing list, along with descriptions of the marketing list.

The tables of the columns in the database schema 300 are merged using common keys, as illustrated in FIG. 3. For example, 318 represents pointers or indexes for the common key "accountKeySourceID." This allows the columns and corresponding tables to be combined and organized to provide lead level demographics and interactions, along with the account level data.

Figure 4:
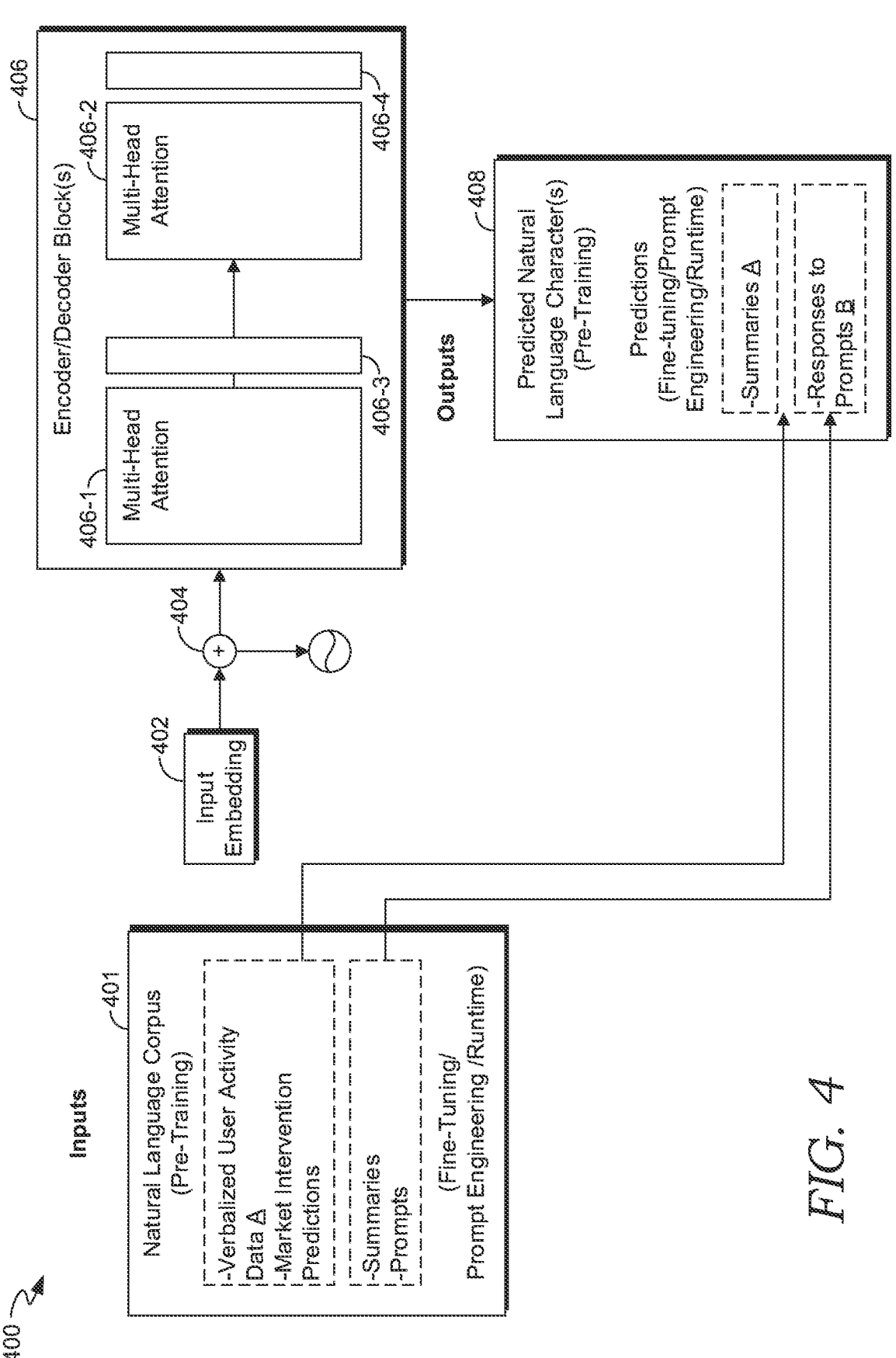
FIG. 4 is a block diagram of a Large Language Model that uses particular inputs to make particular predictions, according to some embodiments.

FIG. 4 is a block diagram of a Large Language Model 400 (e.g., a BERT model or GPT-4 model) that uses particular inputs to make particular predictions (e.g., answers to questions), according to some embodiments. In some embodiments, this model 400 represents or includes the functionality as described with respect to the summarization component and/or the chat interface component 116 of FIG. 1, the lead summarizer 214, the account summarizer 215, and/or the chat backend of FIG. 2. In various embodiments, the language model 400 includes one or more encoders and/or decoder blocks 406 (or any transformer or portion thereof).

First, a natural language corpus (e.g., various WIKIPEDIA English words or BooksCorpus) of the inputs 401 are converted into tokens and then feature vectors and embedded into an input embedding 402 to derive meaning of individual natural language words (for example, English semantics) during pre-training. In some embodiments, to understand English language, corpus documents, such as text books, periodicals, blogs, social media feeds, and the like are ingested by the language model 400.

In some embodiments, each word or character in the input(s) 401 is mapped into the input embedding 402 in parallel or at the same time, unlike existing long short-term memory (LSTM) models, for example. The input embedding 402 maps a word to a feature vector representing the word. But the same word (for example, "apple") in different sentences may have different meanings (for example, phone v. fruit). This is why a positional encoder 404 can be implemented. A positional encoder 404 is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sign/cosine function to generate the positional encoder vector as follows:

$$PE_{(pos,2i)} = \sin\left(pos / 10000^{2i/d_{model}}\right)$$

$$PE_{(pos,2i+1)} = \cos\left(pos / 10000^{2i/d_{model}}\right)$$

After passing the input(s) 401 through the input embedding 402 and applying the positional encoder 404, the output is a word embedding feature vector, which encodes positional information or context based on the positional encoder 404. These word embedding feature vectors are then passed to the encoder and/or decoder block(s) 406, where it goes through a multi-head attention layer 406-1 and a feedforward layer 406-2. The multi-head attention layer 406-1 is generally responsible for focusing or processing certain parts of the feature vectors representing specific portions of the input(s) 401 by generating attention vectors. For example, in Question Answering systems, the multi-head attention layer 406-1 determines how relevant the $i^{th}$ word (or particular word in a sentence) is for answering the question or relevant to other words in the same or other blocks, the output of which is an attention vector. For every word, some embodiments generate an attention vector, which captures contextual relationships between other words in the same sentence or other sequence of characters. For a given word, some embodiments compute a weighted average or otherwise aggregate attention vectors of other words that contain the given word (for example, other words in the same line or block) to compute a final attention vector.

In some embodiments, a single headed attention has abstract vectors Q, K, and V that extract different components of a particular word. These are used to compute the attention vectors for every word, using the following formula:

$$ Z = softmax\left( \frac{Q.K^T}{\sqrt{\text{Dimension of vector } Q, K \text{ or } V}} \right) \cdot V $$

For multi-headed attention, there a multiple weight matrices $W^q$, $W^k$ and $W^v$, so there are multiple attention vectors Z for every word. However, a neural network may only expect one attention vector per word. Accordingly, another weighted matrix, $W^z$, is used to make sure the output is still an attention vector per word. In some embodiments, after the layers 406-1 and 406-2, there is some form of normalization (for example, batch normalization and/or layer normalization) performed to smoothen out the loss surface making it easier to optimize while using larger learning rates.

Layers 406-3 and 406-4 represent residual connection and/or normalization layers where normalization re-centers and re-scales or normalizes the data across the feature dimensions. The feedforward layer 406-2 is a feed forward neural network that is applied to every one of the attention vectors outputted by the multi-head attention layer 406-1. The feedforward layer 406-2 transforms the attention vectors into a form that can be processed by the next encoder block or making a prediction at 408. For example, given that a document includes first natural language sequence "the due date is . . . " the encoder/decoder block(s) 406 predicts that the next natural language sequence will be a specific date or particular words based on past documents that include language identical or similar to the first natural language sequence.

In some embodiments, the encoder/decoder block(s) 406 includes pre-training to learn language (pre-training) and make corresponding predictions. In some embodiments, there is no fine-tuning because some embodiments perform prompt engineering, prompt-tuning, or zero-shot learning. "Prompt engineering" refers to a process of designing or using structured input to the model (referred to as a prompt or prompts) to cause a desired response to be generated by the model. In some embodiments, prompt engineering includes creating the best or optimal prompt, or series of prompts, for the desired user task or output. Accordingly, given a first prompt (which may include target content), if the model produces a first output with a high likelihood of not being the correct response, particular embodiments learn such that a second output (indicative of high likelihood of being correct response) is always produced when such first prompt is provided as input. In this way, at model deployment time, no output is ever produced with a low likelihood of being the correct response if the first prompt (or variation thereof) is provided, thereby increasing the accuracy of the model's generative outputs.

Pre-training is performed to understand language and fine-tuning is performed to learn a specific task, such as learning an answer to a set of questions (in Question Answering systems). In some embodiments, the encoder/decoder block(s) 406 learns what language and context for a word is in pre-training by training on two unsupervised tasks (MLM and NSP) simultaneously or at the same time. In terms of the inputs and outputs, at pre-training, the natural language corpus of the inputs 401 may be various historical documents, such as text books, journals, periodicals in order to output the predicted natural language characters in 408 (not make the predictions at runtime or prompt engineering at this point). The encoder/decoder block(s) 406 takes in a sentence, paragraph, or sequence (for example, included in the input(s) 401), with random words being replaced with masks. The goal is to output the value or meaning of the masked tokens. For example, if a line reads, "please [MASK] this document promptly," the prediction for the "mask" value is "send." This helps the encoder/decoder block(s) 406 understand the bidirectional context in a sentence, paragraph, or line at a document. In the case of NSP, the encoder/decoder block(s) 406 takes, as input, two or more elements, such as sentences, lines, or paragraphs and determines, for example, if a second sentence in a document actually follows (for example, is directly below) a first sentence in the document. This helps the encoder/decoder block(s) 406 understand the context across all the elements of a document, not just within a single element. Using both of these together, the encoder/decoder block(s) 406 derives a good understanding of natural language.

In some embodiments, during pre-training, the input to the encoder/decoder block(s) 406 is a set (for example, 2) of masked sentences (sentences for which there are one or more masks), which could alternatively be partial strings or paragraphs. In some embodiments, each word is represented as a token, and some of the tokens, are masked. Each token is then converted into a word embedding (for example, 402). At the output side is the binary output for the next sentence prediction. For example, this component may output 1, for example, if masked sentence 2 followed (for example, was directly beneath) masked sentence 1. The output is word feature vectors that correspond to the outputs for the machine learning model functionality. Thus, the number of word feature vectors that are input is the same number of word feature vectors that are output.

In some embodiments, the initial embedding (for example, the input embedding 402) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence number (that includes the input(s) 401) that is encoded into a vector (for example, first sentence, second sentence, etc. assuming a top-down and right-to-left approach). The position embeddings are vectors that represent the position of a particular word in such sentence that can be produced by positional encoder 404. When these three embeddings are added or concatenated together, an embedding vector is generated that is used as input into the encoder/decoder block(s) 406. The segment and position embeddings are used for temporal ordering since all of the vectors are fed into the encoder/decoder block(s) 406 simultaneously and language models need some sort of order preserved.

In pre-training, the output is typically a binary value C (for NSP) and various word vectors (for MLM). With training, a loss (for example, cross entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, once pre-training is performed, the encoder/decoder block(s) 406 performs prompt engineering or fine-tuning on a variety of QA data sets by converting different QA formats into a unified sequence-to-sequence format. For example, some embodiments perform the QA task by adding a new question-answering head or encoder/decoder block, just the way a masked language model head is added (in pre-training) for performing a MLM task, except that the task is a part of prompt engineering or fine-tuning. This includes the encoder/decoder block(s) 406 processing the inputs 401 (i.e., the verbalized user activity data, the market intervention predictions, summaries, and/or prompts) in order to make the predictions and confidence scores as indicated in 408. Prompt engineering, in some embodiments, is the process of crafting and optimizing text prompts for language models to achieve desired outputs. In other words, prompt engineering is the process of mapping prompts (e.g., a question) to the output (e.g., an answer) that it belongs to for training. For example, if a user asks a model to generate a poem about a person fishing on a lake, the expectation is it will generate a different poem each time. Users may then label the output or answers from best to worst. Such labels are an input to the model to make sure the model is giving a more human-like or best answers, while trying to minimize the worst answers (e.g., via reinforcement learning). In some embodiments, a "prompt" as described herein includes one or more of: a request (e.g., a question or instruction (e.g., write a poem)), target content, a command or instruction, and/or or more examples (e.g., one-shot or two-shot examples).

The fine-tuning, prompt engineering, or runtime inputs include two categories-category A (i.e., verbalized user activity data and marketer intervention predictions) and category B (i.e., summaries and prompts), which produce respective and corresponding outputs in 408 belonging to the same category A (i.e., summaries) and category B (i.e., responses to prompts). For example, when the inputs 401 include category A (i.e., verbalized user activity data and marketer intervention predictions) the outputs 408 include category A (i.e., the summaries). In some embodiments, the "verbalized user activity data" is the same data output by the verbalization component 112 of FIG. 1 and/or the verbalization engine 212 of FIG. 2. In some embodiments, the marketer intervention predictions are the predictions made as described with respect to the marketer intervention prediction component 108 of FIG. 1. Likewise, in some embodiments, the summaries of the inputs 401 represent the summaries generated by the summarization component 114. In some embodiments, the prompts at the inputs 401 represent user questions or commands received by the chat interface component 116 of FIG. 6. Similarly, in some embodiments, the summaries indicated in the outputs 408 represent the summaries generated by the summarization component 114 of FIG. 1, and the responses to the prompts represents the answers or responses generated by the chat interface component 116 of FIG. 1.

In an illustrative example, in some embodiments, the predictions of the output 408 may be generative text, such as natural language summary of lead user activity data and/or account level user activity data. Alternative to prompt engineering or fine-tuning, in some embodiments the inputs 401 and outputs 408 represent "runtime" inputs and outputs. Runtime represents a time at which after the model 400 has been trained (e.g., via pre-training and/or fine-tuning and/or prompt engineering), tested, and deployed.

Figure 5:
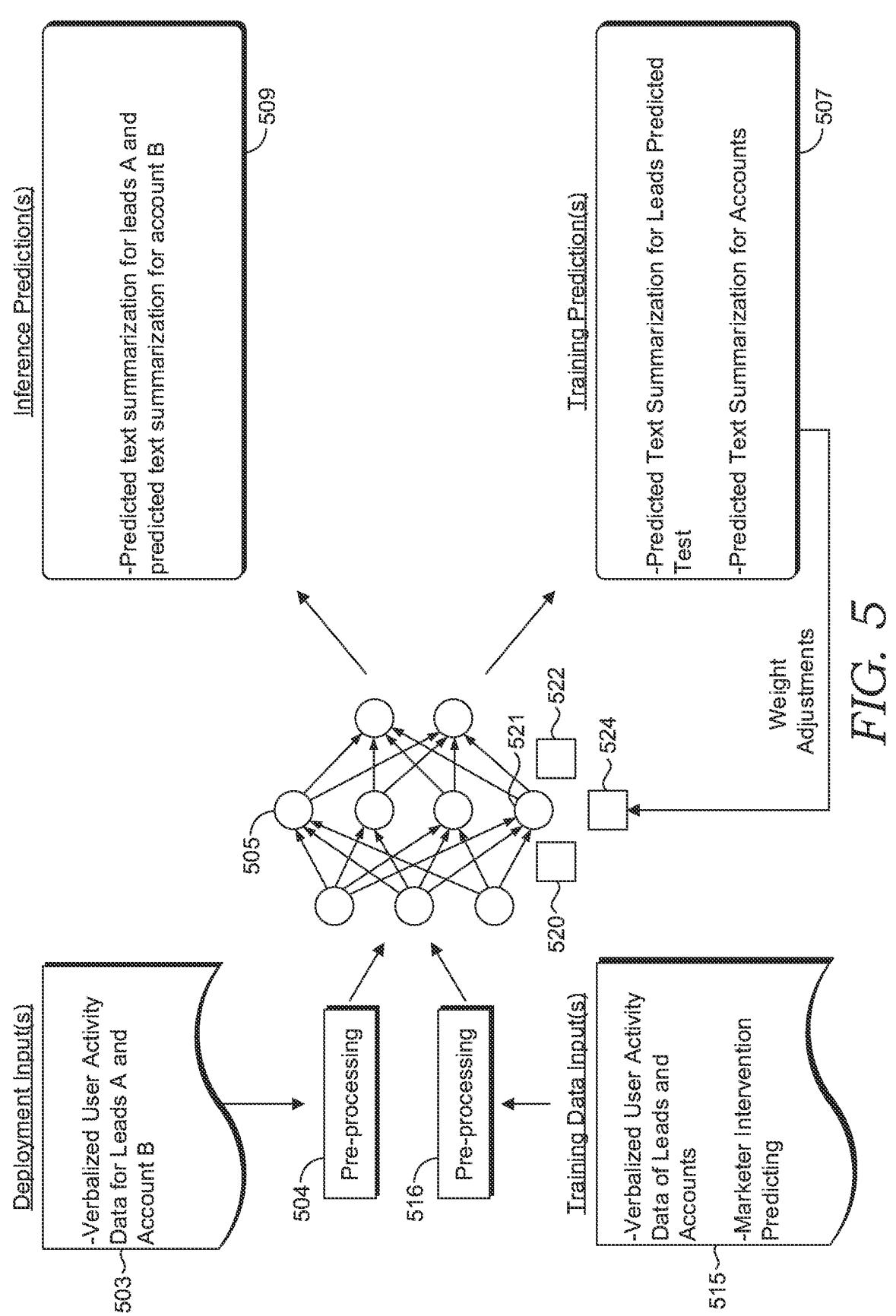
FIG. 5 is a schematic diagram illustrating how a neural network generates text summaries at training time and deployment time, according to some embodiments.

FIG. 5 is a schematic diagram illustrating how a neural network 505 generates text summaries at training time and deployment time, according to some embodiments. In one or more embodiments, the neural network 505 represents or includes at least some of the functionality as described with respect to the large language model 400 of FIG. 4, the summarization component 114, the lead summarizer 214, and/or the account summarizer 215 of FIG. 2. In some embodiments, the neural network 505 represents or includes alternative or additional model functionality, such as supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

The neural network 505 is modeled as a data flow graph (DFG), where each node (e.g., 521) in the DFG is an operator with one or more input and output tensors, such as 520 and 522. A "tensor" (e.g., a vector) is a data structure that contains values representing the input, output, and/or transformations processed by the operator. Each edge of the DFG depicts the dependency between the operators. Neural network 505 includes an input layer, an output layer and one or more hidden layers. An Input layer is the first layer of the neural network 505. The Input layer receives pre-processed (e.g., via the pre-processing 504 or 516) input data represented by 503 and 515, such as verbalized user activity data for leads A and account B. The Output layer is the last layer of neural network 505. The output layer generates one or more inferences in the form of clustering, regression, classifications, or the like, which can either be hard classification (e.g., object is an "apple") or soft probabilities (e.g., 50% likely that an object refers to an apple), which is represented by the inference predictions 509 and 507. Neural network 505 may include any number of hidden layers. Hidden layers are intermediate layers in neural network 505 that perform various operations.

Each node in FIG. 5, such as node 521, is associated with or includes one or more activation tensors, such as input tensor 520, 522, and/or intermediate tensors. An "activation tensor" is a tensor that is an input, intermediate, and/or output to at least one neural network layer (e.g., as modeled going from left to right). This is different than a weight tensor, such as 524, where weight tensors are modeled as flowing upward (not being actual inputs or outputs). In other words activation tensors represent some form of the neural network inputs 503 and 515, such as a database table of user activity data, whereas a weight tensor represents the weight values indicating node activation/inhibition values.

Each node in the network 505 may also be associated with or include and/or one or more weight tensors (e.g., 524), which include weight values. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network represents the strength of a connection between nodes or neurons from one layer (an input) to the next layer (a hidden or output layer). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores.

Each node of the neural network 505 may additionally perform one or more functions using the activation tensors and weight tensors, such as activation functions, matrix multiplication, normalization, or the like. In some embodiments, the nodes in the neural network 505 are fully connected or partially connected. Continuing with FIG. 5, each node may process an input in 503 and 515 (or portion thereof) using activation tensors and weight tensors. For example, the neural network 505 may first receive an entire input, such as verbalized user activity data (generated by the verbalization component 112) and marketer intervention predictions (generated by the marketer intervention production component 108). In some embodiments, the neural network 505 first performs pre-processing 504 or 516, such as encoding or converting such input into machine-readable indicia representing the entire input (e.g., a tensor representing a document). Responsively, the node may then receive an input tensor, which may, for example, represent whether one or more features (e.g., particular words) are present in the input. In some embodiments, the input tensor is an N-dimensional tensor, where N can be greater than or equal to one. In some embodiments, an input tensor represents the input data of neural network 200 if the node is in the input layer 202. In some embodiments, the input tensor 520 is also the output of another node in the preceding layer. In some embodiments after a node, such as the node 521, performs an operation using the input tensor 220, it generates an output tensor 522, which is then passed to the other neurons in the hidden layer and/or output layer. The output tensor 522 represents the output processed by the node 521. For example, the output tensor 522 may be a matrix representing the product of matrix multiplication or a matrix indicating whether a particular user activity type (e.g., clicks) and/or quantity was present. In various embodiments, the output tensor 522 represents an input of another node in the succeeding layer (i.e., the output layer).

In some embodiments, node 521 applies a weight tensor 524 to the input tensor 520 via a linear operation (e.g., matrix multiplication, addition, scaling, biasing, or convolution). All other nodes in the neural network may perform identical functionality. In some embodiments, the result of the linear operation is processed by a non-linear activation, such as a step function, a sigmoid function, a hyperbolic tangent function (tan h), and rectified linear unit functions (ReLU) or the like. The result of the activation or other operation is an output tensor 522 that is sent to a subsequent connected node that is in the next layer of neural network 200. The subsequent node uses the output tensor 522 as the input activation tensor to another node.

Each of the functions in the neural network 505 may be associated with different coefficients (e.g., weights and kernel coefficients) that are adjustable during training. For example, after preprocessing 516 (e.g., normalization, feature scaling and extraction) in various embodiments, the neural network 505 is trained using one or more data sets of the preprocessed training data inputs 515 in order to make acceptable loss training predictions at the appropriate weights to set the weight tensors. This will help later at deployment time to make correct inference predictions 509. In one or more embodiments, learning or training includes minimizing a loss function between the target variable (for example, an incorrect prediction that Y summary for verbalized user activity is X) and the actual predicted variable (for example, a correct prediction that T summary is the summary when the verbalized user activity is X). Based on the loss determined by a loss function (for example, Mean Squared Error Loss (MSEL), cross-entropy loss, etc.), the loss function learns to reduce the error in prediction over multiple epochs or training sessions so that the neural network 505 learns which features and weights are indicative of the correct inferences, given the inputs. Accordingly, it is desirable to arrive as close to 100% confidence in a particular classification or inference as much as possible so as to reduce the prediction error. In an illustrative example, the neural network 505 learns that for a given set of character sequences, the correct meaning or the text to be generated next is Y.

Subsequent to a first round/epoch of training, the neural network 505 makes predictions with a particular weight value, which may or may not be at acceptable loss function levels. For example, the neural network 505 may process the pre-processed training data inputs 515 a second time to make another pass of predictions. This process may then be repeated over multiple iterations or epochs until the weight values in the weight tensors are learned for optimal or correct predicted values (for example, by maximizing rewards and minimizing losses) and/or the loss function reduces the error in prediction to acceptable levels of confidence.

In some embodiments, before the pre-training data input(s) 515 (or deployment input(s) 503) are provided as input into the neural network 505, the inputs are preprocessed at 516 (or 504). In some embodiments, such pre-processing includes feature scaling, feature extraction, normalization, and the like. Scaling (or "feature scaling") is the process of changing number values (e.g., via normalization or standardization) so that a model can better process information. For example, some embodiments can bind number values between 0 and 1 via normalization. Other examples of preprocessing includes feature extraction, handling missing data, feature scaling, and feature selection.

Feature extraction involves computing a reduced set of values from a high-dimensional signal capable of summarizing most of the information contained in the signal. Feature extraction techniques develop a transformation of the input space onto the low-dimensional subspace that attempts to preserve the most relevant information. In feature selection, input dimensions that contain the most relevant information for solving a particular problem are selected. These methods aim to improve performance, such as estimated accuracy, visualization, and comprehensibility. An advantage of feature selection is that important information related to a single feature is not lost, but if a small set of features is required and original features are very diverse, there is chance of information being lost as some of the features must be omitted. On the other hand, with dimensionality reduction, also known as feature extraction, the size of the feature space can often be decreased without losing information about the original feature space.

In some embodiments, the pre-processing of the data at 516 and/or 504 includes missing data techniques. In some embodiments, these missing data techniques include complete case analysis, single imputation, log-linear models and estimation using the EM algorithm, propensity score matching, and multiple imputations. The technique confines attention to cases for which all variables are observed in a complete case analysis. In a single implicit imputation method, missing values are replaced by values from similar responding units in the sample. The similarity is determined by looking at variables observed for both respondent and non-respondent data. Multiple imputations replace each missing value with a vector of at least two imputed values from at least two draws. These draws typically come from stochastic imputation procedures. In the log linear model, cell counts of a contingency table are modeled directly. An assumption can be that, given expected values for each cell, the cell counts follow independent multivariate Poisson distributions. These are conditional on the total sample size, with the counts following a multinomial distribution.

In some embodiments, the preprocessing at 516 and/or 504 includes outlier detection and correction techniques for handling outlier data within the input data 515/503. Outliers, by virtue of being different from other cases, usually exert a disproportionate influence on substantive conclusions regarding relationships among variables. An outlier can be defined as a data point that deviates markedly from other data points. For example, error outliers are data points that lie at a distance from other data points because they result from inaccuracies. More specifically, error outliers include outlying observations that are caused by not being part of the targeted population of data, lying outside the possible range of values, errors in observation, errors in recording, errors in preparing data, errors in computation, errors in coding, or errors in data manipulation. These error outliers can be handled by adjusting the data points to correct their values or more such data points from the data set. In some implementations, particular embodiments define values more than three scaled median absolute deviations ("MAD") away from the median as outliers. Once defined as an outlier, some embodiments replace the values with threshold values used in outlier detection.

In some embodiments, the preprocessing at 516 and/or 504 includes feature selection at the input data 515 and/or 503. Feature selection techniques can be performed for dimensionality reduction from the extracted features. The feature selection techniques can be used to reduce the computational cost of modeling, to achieve a better generalized, high-performance model that is simple and easy to understand. Feature extraction techniques can be performed to reduce the input data's dimensionality. However, in some implementations, the resulting number of features may still be higher than the number of pre-training data 515. Therefore, further reduction in the dimensionality of the data can be performed using feature selection techniques to identify relevant features for classification and regression. Feature selection techniques can reduce the computational cost of modeling, prevent the generation of a complex and over-fitted model with high generalization error, and generate a high-performance model that is simple and easy to understand. Some embodiments use the mRmR sequential feature selection algorithm to perform feature selection. The mRmR method is designed to drop redundant features, which can design a compact and efficient machine learning-based model.

In one or more embodiments, the neural network 505 converts or encodes the deployment input(s) 503 and training data input(s) 515 into corresponding feature vectors in feature space (for example, via a convolutional layer(s)). A "feature vector" (also referred to as a "vector") as described herein may include one or more real numbers, such as a series of floating values or integers (for example, [0, 1, 0, 0]) that represent one or more other real numbers, a natural language (for example, English) word and/or other character sequence (for example, a symbol (for example, @,!, #), a phrase, and/or sentence, etc.). Such natural language words and/or character sequences correspond to the set of features and are encoded or converted into corresponding feature vectors so that computers can process the corresponding extracted features. For example, embodiments can parse, tokenize, and encode each value or other content in pages into one or more feature vectors.

Continuing with FIG. 5, in some embodiments, the neural network 505 is trained in a supervised in a supervised manner using annotations or labels. For example, in some embodiments, training includes (or is preceded by) annotating/labeling training data 515 so that the neural network 505 learns the features, which is used to change the weights/neural node connections for future predictions. As such, the neural network 505 accordingly adjusts the weights (the weight tensors) or deactivates nodes such that certain words are likely to follow other words (e.g., in NSP or MLM). For example, each prompt (e.g., verbalized user activity) may be labeled with the correct answer (e.g., a predicted text summary) or each answer may be labeled with the correct prompt. In another example, each marketer intervention prediction may be labeled with a particular summary.

In one or more embodiments, subsequent to the neural network 505 training, the neural network 505 (for example, in a deployed state) receives one or more of the pre-process deployment input(s) 503. When a machine learning model is deployed, it has typically been trained, tested, and packaged so that it can process data it has never processed. Responsively, in one or more embodiments, the deployment input(s) 503 are fed to the neural network 505, which then uses the same weight tensors (e.g., 524) that were learned via training so that the neural network 505 can produce the correct inference predictions 509.

Figure 6:
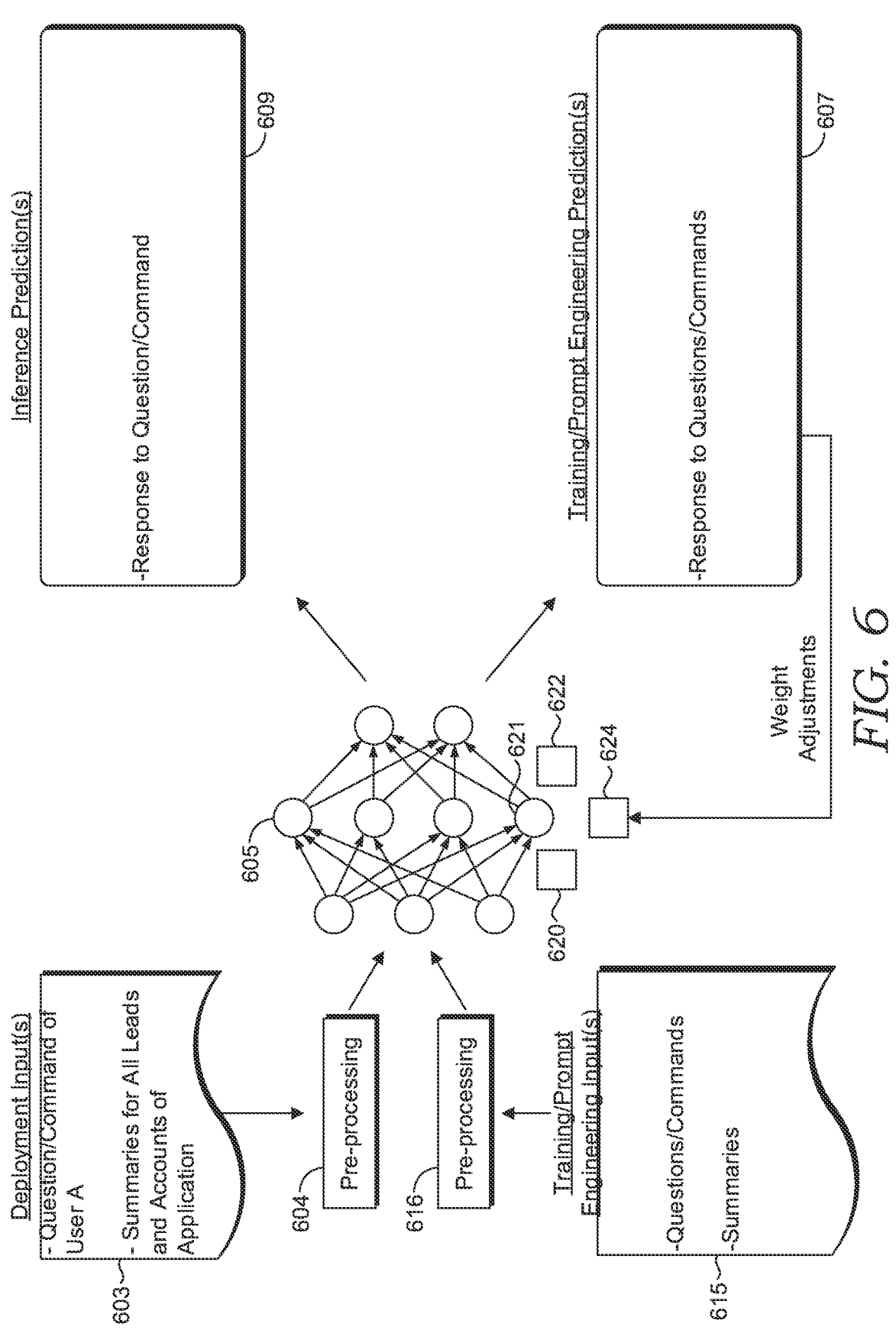
FIG. 6 is a schematic diagram illustrating how a neural network generates responses to questions or commands, according to some embodiments.

FIG. 6 is a schematic diagram illustrating how a neural network 605 generates responses to questions or commands, according to some embodiments. In one or more embodiments, the neural network 605 represents or includes at least some of the functionality as described with respect to the large language model 400 of FIG. 4, the chat interface component 116 of FIG. 1, and/or the chat backend 216 of FIG. 2. In some embodiments, the neural network 605 represents the same neural network 505 of FIG. 5 or alternatively represents a separate neural network. In some embodiments, the summaries produced at the output predictions 509 and/or 507 represent the same summaries used in the inputs 603 and/or 615 of FIG. 6.

The Input layer of the neural network 605 receives pre-processed (e.g., via the pre-processing 604 or 616) input data represented by 603 and 615, such as questions and/or commands of one or more users and summaries. The output layer of the neural network 605 generates one or more inferences in the form of clustering, regression, classifications, or the like, which can either be hard classification (e.g., object is an "apple") or soft probabilities (e.g., 50% likely that an object refers to an apple), which is represented by the inference predictions 609 and 607. Neural network 605 may include any number of hidden layers. Hidden layers are intermediate layers in neural network 605 that perform various operations.

Each node in FIG. 6, such as node 621, is associated with or includes one or more activation tensors, such as input tensor 620, 622, and/or intermediate tensors. The neural network 605 includes one or more weight tensors, such as 524, where weight tensors are modeled as flowing upward (not being actual inputs or outputs).

Continuing with FIG. 6, each node may process an input in 603 and 615 (or portion thereof) using activation tensors and weight tensors. For example, the neural network 605 may first receive an entire input, such as questions/commands and summaries (generated by the summarization component 114). In some embodiments, the neural network 605 first performs pre-processing 604 or 616, such as encoding or converting such input into machine-readable indicia representing the entire input (e.g., a tensor representing a summary). Responsively, the node may then receive an input tensor, which may, for example, represent whether one or more features (e.g., particular words) are present in the input. In some embodiments, the input tensor is an N-dimensional tensor, where N can be greater than or equal to one. In some embodiments, an input tensor represents the input data of neural network 506 if the node is in the input layer. In some embodiments, the input tensor 620 is also the output of another node in the preceding layer. In some embodiments after a node, such as the node 621, performs an operation using the input tensor 620, it generates an output tensor 622, which is then passed to the other neurons in the hidden layer and/or output layer. The output tensor 622 represents the output processed by the node 621. For example, the output tensor 622 may be a matrix representing the product of matrix multiplication or a matrix indicating whether a particular word in the summary and/or question was present. In various embodiments, the output tensor 622 represents an input of another node in the succeeding layer (i.e., the output layer).

In some embodiments, node 621 applies a weight tensor 624 to the input tensor 620 via a linear operation (e.g., matrix multiplication, addition, scaling, biasing, or convolution). All other nodes in the neural network may perform identical functionality. In some embodiments, the result of the linear operation is processed by a non-linear activation, such as a step function, a sigmoid function, a hyperbolic tangent function (tan h), and rectified linear unit functions (ReLU) or the like. The result of the activation or other operation is an output tensor 622 that is sent to a subsequent connected node that is in the next layer of neural network

605. The subsequent node uses the output tensor 622 as the input activation tensor to another node.

Each of the functions in the neural network 505 may be associated with different coefficients (e.g., weights and kernel coefficients) that are adjustable during training. For example, after preprocessing 616 (e.g., normalization, feature scaling and extraction) in various embodiments, the neural network 605 is trained using one or more data sets of the preprocessed training data inputs 615 in order to make acceptable loss training predictions at the appropriate weights to set the weight tensors. This will help later at deployment time to make correct inference predictions 609. In one or more embodiments, learning or training includes minimizing a loss function between the target variable (for example, an incorrect prediction that the response to question X is Y) and the actual predicted variable (for example, a correct prediction that the response to question X is B). Based on the loss determined by a loss function (for example, Mean Squared Error Loss (MSEL), cross-entropy loss, etc.), the loss function learns to reduce the error in prediction over multiple epochs or training sessions so that the neural network 605 learns which features and weights are indicative of the correct inferences, given the inputs. Accordingly, it is desirable to arrive as close to 100% confidence in a particular classification or inference as much as possible so as to reduce the prediction error. In an illustrative example, the neural network 605 learns that for a given set of character sequences, the correct text to be generated at a response is "the leads that performed user activity Y are as follows . . . "

Subsequent to a first round/epoch of training, the neural network 605 makes predictions with a particular weight value, which may or may not be at acceptable loss function levels. For example, the neural network 605 may process the pre-processed training data inputs 615 a second time to make another pass of predictions. This process may then be repeated over multiple iterations or epochs until the weight values in the weight tensors are learned for optimal or correct predicted values (for example, by maximizing rewards and minimizing losses) and/or the loss function reduces the error in prediction to acceptable levels of confidence.

Once the weight tensors (e.g., 624) are set or learned via training. The neural network 605 is then ready to process the deployment input(s) 603, where, for example, the neural network receives a question and/or command of a user A, as well as all summaries for all leads and accounts generated for a particular consumer application. As each neural network node processes each input tensor, a weight tensor set during training is aggregated (e.g., via matrix multiplication) with such activation tensor in order to derive the inference prediction(s) 609, such as the response to the question/command of the same user A.

Figure 7A:
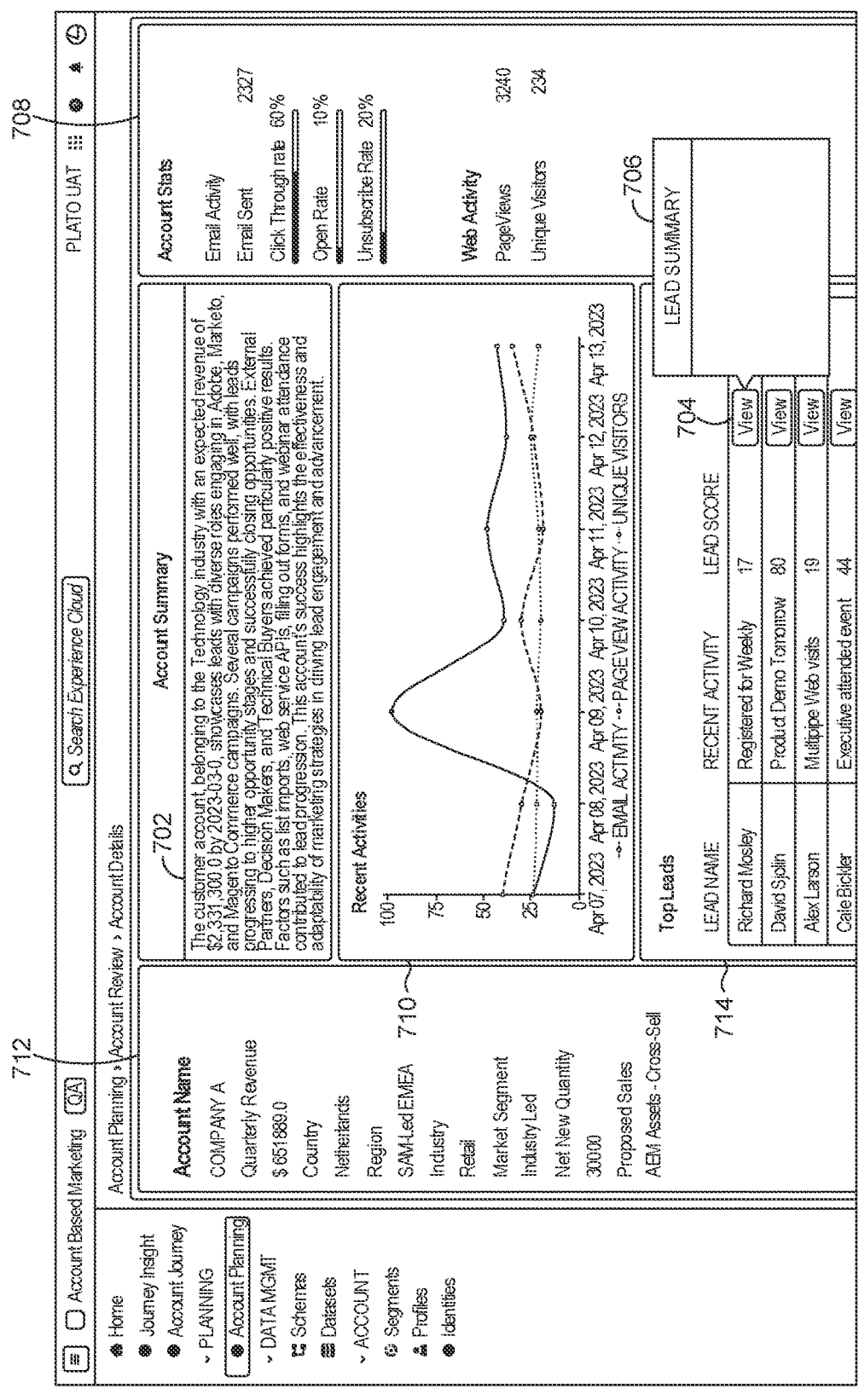
FIG. 7A is a screenshot of an example user interface page illustrating that account summaries and lead summaries are presented to a user at a single page, according to some embodiments.

FIG. 7A is a screenshot 700 of an example user interface page illustrating that account summaries and lead summaries are presented to a user at a single page, according to some embodiments. The screenshot 700 includes the account attributes 712, the account summary 702, the account statistics 708, the account chart 710, the top leads 714, and the lead summaries, such as lead summary 706. In some embodiments, in order to build the user interface, each of these act as components are built first so that an interface inventory can be performed by the user. Next, in some embodiments, a pattern library is generated. A pattern library A pattern library identifies and classifies design patterns that are recurring solutions to typical design problems. A pattern library breaks an interface down into smaller elements that can then be used as reusable building blocks. In short, particular embodiments create small interface building blocks (e.g., 704) and then put these together to create progressively more complicated interface elements, such as 714 and 706. The benefits of atomic design are that you can ensure consistency by combining elements at a granular level and then build up from these. In some embodiments, the screenshot 700 is a part of the consumer application 118.

In some embodiments, the account summary 702 is generated as described with respect to the summarization component 114 of FIG. 1 and/or the account summarizer 15 of FIG. 2. Similarly, in some embodiments, the lead summary 706 is generated as described with respect to the summarization component 114 of FIG. 1 and/or the lead summarizer 214 of FIG. 2. In some embodiments, the account statistics 708 is generated by the user activity extractor 102 as described with respect to FIG. 1.

The account attributes 712 list various attributes of the account, such as the company name, country of origin, region, industry that the company is in, market segment that the account is in, and the like. The account statistics 708 indicate the statistics for various categories of user activity types, such as a quantity of emails sent, click through rate (e.g., number of clicks that each ad of the account receives divided by the number of times each ad is shown), open rate (percentage rate that each email of the account is opened), unsubscribe rate (e.g., the number of unsubscribes divided by the number of emails delivered), quantity of page views for the account, and a quantity of unique visitors to web pages of the account.

The top leads component 714 lists the leads of the particular account with the highest quantity of user activity, where the higher the user activity the higher the score. The chart 710 is a visualization that indicates recent user activity data, where the Y-axis represents the particular user activity data (e.g., quantity of clicks) and the X-axis represents a particular month in the year. In response to receiving an indication that the user has selected (e.g., hovered over) the view button 704, particular embodiments generate the user interface elements 706, which includes a particular lead summary for the corresponding lead.

Figure 7B:
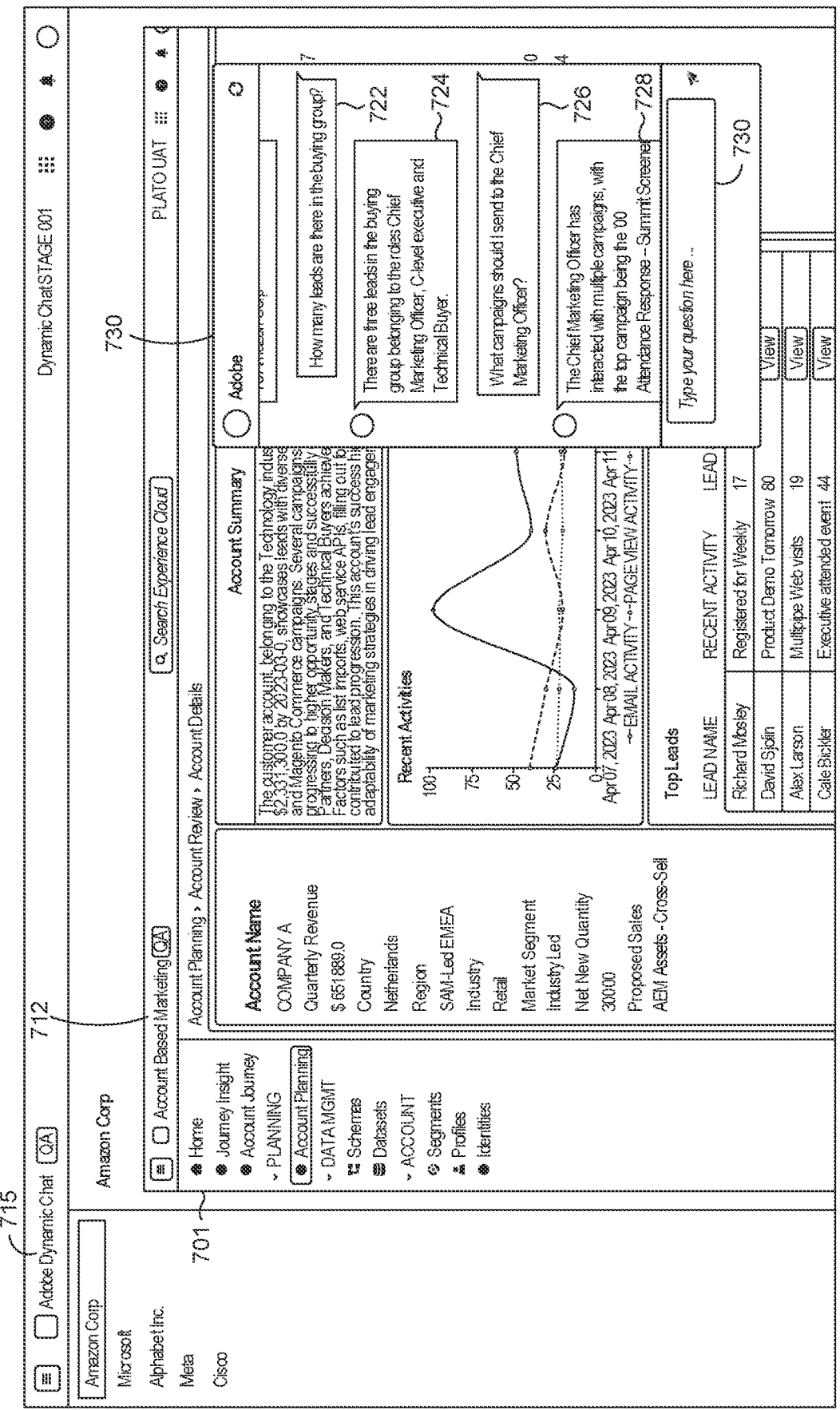
FIG. 7B is a screenshot of the example user interface of FIG. 7A that additionally includes chat functionality, according to some embodiments.

FIG. 7B is a screenshot 701 of the example user interface of FIG. 7A that additionally includes chat functionality, according to some embodiments. In response to receiving an indication that a user has selected a particular user interface element, such as the button 715 of FIG. 7A, particular embodiments cause presentation of the chat window 730, where the field 730 is presented and which is configured to receive a natural language user input, such as a command or question. For example, in response to receiving the question 722, the chat interface component 116 (e.g., using the summary 702 as input) of FIG. 1 produces the response 724. Likewise, in response to receiving the question 726, the chat interface component 116 of FIG. 1 produces the response 728.

Exemplary Flow Diagrams

FIG. 8 is a flow diagram of an example process 800 for generating at least one summary associated with a row of a table, according to some embodiments. The process 800 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 7B). The computer-implemented method, the system (that includes at least one computing device having at least one processor and at least one computer readable storage medium), and/or the computer readable medium as described herein may perform or be caused to perform the process 800 or any other functionality described herein. In some embodiments, the process 800 is performed by the mask generation component 102 of FIG. 1.

Per block 800, particular embodiments access (e.g., from a memory address in memory), user activity data in one or more tables, each table having one or more columns and one or more rows, a column having a column name, a row having one or more values. In some embodiments, each column has a column name and each row has one or more values. In some embodiments, any suitable data can alternatively or additionally be accessed, such as any lead data (e.g., name of lead) of a lead and any account data (e.g., name of an account) of an account. Likewise, in some embodiments, although the process 800 is performed for a particular row and column that has a column name, the process 800 can be performed for some or each columns, column names, and/or rows.

Based on the one or more tables, some embodiments generate, via a machine learning model, one or more scores (or predictions) indicative of at least one of: an indication (e.g., the name or ID) of an account or lead that should be sent a digital marketing advertisement, a particular campaign to use for the lead or account, and a particular channel (e.g., any communication medium, such as SMS text, email, or chat) and time to provide the digital marketing advertisement or use in the digital marketing campaign. In some embodiments, such functionality includes the functionality as described with respect to the marketer intervention prediction component 108.

In some embodiments, the one or more tables include a first table and a second table (e.g., database tables). For example, the first table can describe lead data of multiple leads (e.g., a role of each lead, user activity data of each lead, opportunity stage and type of each lead, an advertising campaign that was used for a lead), where a "lead" is a member of an account. For example, a "member" can be a customer or potential customer of the account. Alternatively or additionally, a "member" can be an employee, contractor, or other member of an account. The second table one or more accounts, where an "account" is a particular organization. An "organization" as described herein refers to any suitable group, such as a business organization (e.g., a corporation, limited liability company (LLC), limited liability partnership (LLP), a non-profit organization, a buying group, or the like), a club, or the like. Each account typically has multiple leads. In an illustrative example of what the one or more tables can include, they can include a role of each lead (e.g., a business organization title, such as CFO), user activity data of each lead (e.g., logs of all computer user input), opportunity stage and type of each lead, an advertising campaign that was used for a lead, account name, account industry, revenue amount for each account, and number of employees of each account. In some embodiments, the data located in the tables includes any data as described with respect to the lead user activity database 202, the account database 203, and/or the database table schema 300 of FIG. 3.

Some embodiments pre-process the user activity data, such as anonymizing (e.g., encrypting, obfuscating, or deleting) personally identifiable information (e.g., names, phone numbers, credit cards, passwords, user names, email addresses, physical addresses, etc.) in the user activity data. In some embodiments, this includes the functionality as described with respect to the preprocessing component 106 of FIG. 1.

Per block 804, based on a semantic meaning of the column name, particular embodiments generate, via computer natural language processing, a set of natural language characters for the column name. For example, for the column name "click," some embodiments generate, via Named Entity Recognition (NER), a "click" tag next to the word "click," which indicates that the word "click" corresponds to a particular user activity type—i.e., a "click." For example, particular embodiments can generate the phrase, "click, a type of computer user input." The set of natural language characters can be any suitable string or letter combination, such as letters, words, paragraphs or the like.

Per block 806, for the rows, some embodiments generate a natural language sentence by combining the set of natural language characters with the one or more values (e.g., the verbalizations output by the verbalization component 112 of FIG. 1). For example, under the "click" column may be the number 30. Accordingly, a model can, for example, generate the natural language sentence, "a person by the name of Jon, was responsible for performing a click, a type of user input, in the amount of 30 times." Accordingly, the phrase "click, a type of computer user input" was combined with the value 30 (and additional natural language characters) to formulate a full sentence.

Some embodiments stitch two or more tables together (e.g., the first table and the second table described above) such that block 806 is based on such stitching. For example, particular embodiments, the row may include both account data from an account and lead data, which are both included in the natural language sentence. In some embodiments, such stitching is performed as described with respect to the stitching component 104 of FIG. 1.

Per block 808, in response to the generating of the natural language sentence, some embodiments provide the natural language sentence as input into a language model. The language model outputs at least one summary associated with the row. For example, using the illustration above, the sentence, "a person by the name of Jon, was responsible for performing a click, a type of user input, in the amount of 30 times" can be re-formatted or restructured as a summary, such as "Jon issued 30 clicks . . . " which reduces the words and clarifies the natural language sentence. In some embodiments, the generation of the summary includes the functionality as described, for example, with respect to the summarization component 114 of FIG. 1, the lead summarizer 214, and/or the account summarizer 215 of FIG. 2. For instances, the at least one summary can include a summary of all user activity data for a lead (e.g., as described with respect to the user interface element 706 of FIG. 7A) and/or a summary of all user activity data for each lead in the account (e.g., as described with respect to the account summary 702 of FIG. 7A.

A "language model" is a set of statistical or probabilistic functions that performs Natural Language Processing (NLP) in order to understand, learn, and/or generate human natural language content. For example, a language model can be a tool that determines the probability of a given sequence of words occurring in a sentence (e.g., via NSP or MLM) or natural language sequence. Simply put, it can be a tool which is trained to predict the next word in a sentence. A language model is called a large language model ("LLM") when it is trained on enormous amount of data. Some examples of LLMs are GOOGLE's BERT and OpenAI's GPT-2 and GPT-3. GPT-3, which is the largest language model with 175 billion parameters trained on 570 gigabytes of text. These models have capabilities ranging from writing a simple essay to generating complex computer codes-all with limited to no supervision. Accordingly, an LLM is a deep neural network that is very large (billions to hundreds of billions of parameters) and understands, processes, and produces human natural language by being trained on massive amounts of text. These models can predict future words in a sentence letting them generate sentences similar to how humans talk and write. In some embodiments, the LLM is pre-trained (e.g., via NSP and MLM on a natural language corpus to learn English) without having been fine-tuned, but rather uses prompt engineering/prompting/prompt learning using one-shot or few-shot examples.

FIG. 9 is a flow diagram of an example process 900 for verbalizing columns names and row values of a table, according to some embodiments. In some embodiments, the process 900 is performed by the verbalization component 112 of FIG. 1 and/or the verbalization engine 212 of FIG. 2. Although FIG. 9 is described with respect to a single table, the same process can be performed for multiple tables, such as multiple tables stitched by the stitching component 104 of FIG. 1.

Per block 903, particular embodiments retrieve column names and values from a table. For example, particular embodiments extract and copy, in memory, each column name and each row value from a database table. Per block 905, for each column name, particular embodiments determine its semantic meaning and corresponding natural language phrase. A "natural language phrase" can be one or more natural language characters, such as multiple letters to form a word, multiple words to form a sentence, or the like. In an illustrative example of block 903, particular embodiments can retrieve the column name of "age" and determine its semantic meaning (i.e., the amount of time someone has been alive in years) by performing natural language processing via training, the context of proceeding column names and/or row values (e.g., "name,"), or succeeding column names (e.g., "title"). These embodiments may responsively generate a natural language phrase, such as "current age of a person," which indicates that this name refers to an age of a person. In some embodiments, determining the semantic meaning includes using one or more models, such as WORD2VEC, Long Short Term Memory (LSTM), or the like. In some embodiments, block 905 includes the functionality described in block 804 of vice versa.

Per block 907, for each row, particular embodiments combine each natural language phrase with their corresponding values to form a natural language sentence. For example, for a single row, using the illustration above, particular embodiments may combine the "age" column and "name" column and their corresponding values to formulate the sentence, "an entity, Joseph, is of the current age of 30." In some embodiments, block 907 includes or represents block 806 of FIG. 8 or vice versa. Per block 909, some embodiments optionally concatenate the natural language sentences generated at block 907 to form paragraphs or text blocks. For example, particular embodiments can consolidate each lead by consolidating each row or record of each lead to formulate a natural language description of the entire account (e.g., a natural language description of each lead's user activity data for the account).

FIG. 10 is a flow diagram of an example process 1000 for receiving a response to a user question or command, according to some embodiments. In some embodiments, the process 1000 is performed by the chat interface component 116 as described with respect to FIG. 1. Per block 1002, some embodiments access (e.g., from a memory address in memory) a summary of at least lead data of a lead or account data of an account. In some embodiments, such summary is the same summary as generated at block 808 of FIG. 8. For instance, after block 808, particular embodiments store, at an address location in memory, the summary for later access in the process 1000. In some embodiments, such summary accessed at block 1002 is formulated as described with respect to the summarization component 114 of FIG. 1, the lead summarizer 214 of FIG. 2, and/or the account summarizer 215 of FIG. 2. In an illustrative example, the generated summary may be the account summary 702 of FIG. 7A.

Per block 1004, some embodiments, receive, via a chat interface, a user question or command associated with the summary. For example, referring back to FIG. 7B, particular embodiments receive an indication that the user has input the question 722 in the text field 730. Per block 1006, in response to the receiving of the user question or command, particular embodiments provide a language model with the summary and the user question or command as input. For example, referring back to FIG. 7B, in response to receiving an indication that the user has input the question 722 into the text field 730, particular embodiments provide the neural network 605 with these inputs (e.g., the inputs 603). In some embodiments, the providing of the summary as input includes calling the language model with a query in response to receiving the user question or command, where the model executes the query and generates the response based on retrieving information from the summary. For example, using the illustration above, the answer to the question 722 may be directly located within the account summary 702. Accordingly, the neural network 605 can directly access the response to the question by doing a computer read of the account summary 702 to look for semantic similarities or word matches to terms in the query.

Per block 1008, based on the providing at block 1006, some embodiments receive, via the language model, an output comprising a response to the user question or command. For example, referring back to FIG. 7B, particular embodiments generate the answer 724 responsive to the question 722.

Exemplary Operating Environments

Turning now to FIG. 11, a schematic depiction is provided illustrating an example computing environment 1100 for generating a summary and/or providing a response in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 1110 that represent nodes in a cloud computing network. Various functions described herein as being performed by one or more entities may be carried out by hardware, firmware, and/or software. For instance, various functions may be carried out by a processor executing instructions stored in memory.

The environment 1100 depicted in FIG. 11 includes a prediction server ("server") 1110 that is in communication with a network 110. The environment 1100 further includes a client device ("client") 1120 that is also in communication with the network 110. Among other things, the client 1120 can communicate with the server 1110 via the network 110, and generate for communication, to the server 1110, a request to make a detection, prediction, or classification of one or more instances of a document/image. The request can include, among other things, a document with content order values. In various embodiments, the client 120 is embodied in a computing device, which may be referred to herein as a client device or user device, such as described with respect to the computing device 1200 of FIG. 12.

In some embodiments, each component in FIG. 1 is included in the server 1110 and/or the client device 1120. Alternatively, in some embodiments, the components of FIG. 1 are distributed between the server 1110 and client device 1120.

The server 1110 can receive the request communicated from the client 1120, and can search for relevant data via any number of data repositories to which the server 1110 can access, whether remotely or locally. A data repository can include one or more local computing devices or remote computing devices, each accessible to the server 1110 directly or indirectly via network 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 1110 is embodied in a computing device, such as described with respect to the computing device 1200 of FIG. 12.

Figure 12:
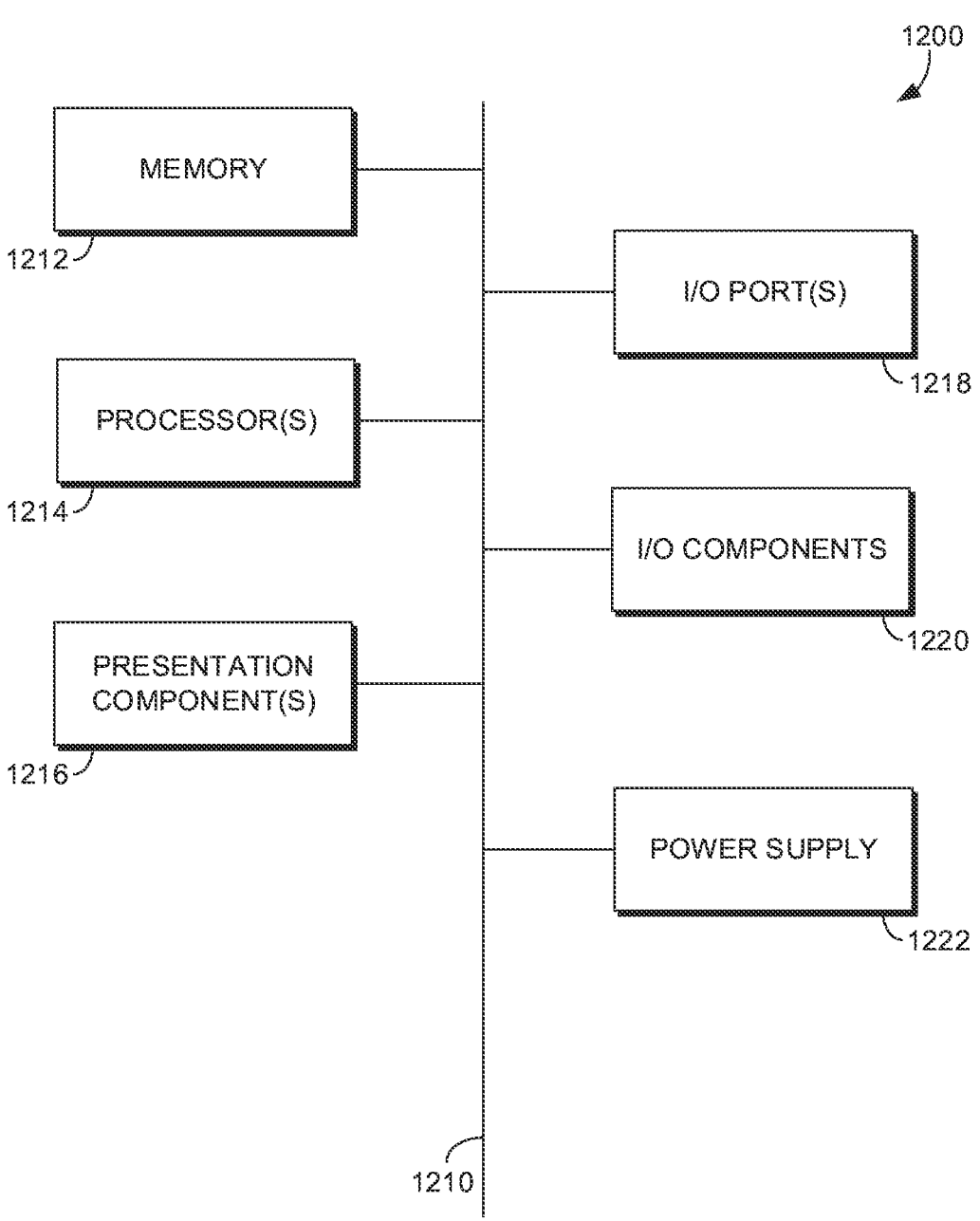
FIG. 12 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

Looking now to FIG. 12, computing device 1200 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1200 represents the client device 1120 and/or the server 1110 of FIG. 11.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 900 of FIG. 9, process 1000 of FIG. 10, or any functionality described with respect to FIGS. 1 through 11.

I/O ports 18 allow computing device 1200 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be equipped with depth cameras, such as stereoscopic camera systems, infrared camera systems, RGB camera systems, touchscreen technology, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
   at least one computer processor; and
   one or more computer storage media storing computer-useable instructions that, when used by the at least one computer processor, cause the at least one computer processor to perform operations comprising:
   accessing, from the one or more computer storage media, user activity data in one or more database tables, the user activity data including statistics indicating a quantity of different types of computer user input, each database table, of the one or more database tables, having one or more columns and one or more rows, a column, of the one or more columns, having a column name indicated in natural language, a row, of the one or more rows, having one or more values that are a part of the statistics indicating the quantity of different types of computer user input;

generating, via computer natural language processing, a machine-readable tag, the machine-readable tag providing additional contextual text that supplements the column name to indicate an entity type of the column;

for the row, generating a natural language sentence by combining the column name and the machine-readable tag of the column with the one or more values that are the part of the statistics indicating the quantity of different types of computer user input; and at least partially responsive to the generating of the natural language sentence, encoding the natural-language sentence into a numerical tensor representation and providing the numerical tensor representation as input to a transformer-based language model comprising an attention mechanism, wherein an output layer of the language model generates an embedding vector corresponding to a semantic summary associated with the row based on the attention mechanism.

2. The system of claim 1, wherein the operations further comprising:

receiving a user question or command via a chat interface;

in response to receiving of the user question or command, providing the language model or a second language model with the summary and the user question or command as input; and based on the providing, receiving an output comprising a response to the user question or command.

3. The system of claim 2, wherein the providing the summary as input includes calling the second language model with a query in response to the receiving of the user question or command, and wherein the second model executes the query and generates the response based on retrieving information from the summary.

4. The system of claim 2, wherein the operations further comprising:

based on the one or more tables, generating, via a machine learning model, a prediction indicative of at least one of: an indication of an account or lead that should be sent a digital marketing advertisement, a particular campaign to use for the account or lead, and a particular channel and time to provide the digital marketing advertisement or the particular campaign, and wherein the response to the user question or command is further based on the prediction.

5. The system of claim 1, wherein the one or more tables includes a first table and a second table, the first table describes lead data of multiple leads, a lead being a member of an account, and wherein second table describes one or more accounts, an account being a particular organization.

6. The system of claim 5, wherein the operations further comprising stitching the first table and the second table together such that the first table and the second table are merged.

7. The system of claim 1, wherein the one or more tables includes at least one of: a role of each lead, user activity data of each lead, opportunity stage and type of each lead, an advertising campaign that was used for each lead, account name, account industry, revenue amount of each account, and number of employees of each account.

8. The system of claim 1, wherein the operations further comprising preprocessing the user activity data, and wherein the preprocessing includes anonymizing all personally identifiable information in the user activity data.

9. The system of claim 1, wherein the at least one summary includes a lead summary that summarizes user activity data of a first lead and an account summary that summarizes user activity data of the first lead and at least a second lead for an account.

10. A computer-implemented method comprising:

accessing, from one or more computer storage media, data from one or more tables, the data includes at least one of lead data of a lead and account data of an account, each table, of the one or more tables having one or more columns and one or more rows, each column, of the one or more columns, having a column name, each row, of the one or more rows, having one or more values corresponding to statistics of computer user input of the lead or the account;

generating, for each column name and via computer natural language processing, a machine-readable tag that indicates a semantic meaning of a respective column name of the one or more tables;

generating one or more natural language sentences by combining at least the computer-readable tag with the one or more values corresponding to the statistics of computer user input of the lead or account for each row of the one or more tables; and encoding the one or more natural language sentences into a numerical tensor representation and providing the numerical tensor representation as input into a language model comprising an attention mechanism, wherein an output layer of the language model generates an embedding vector representing at least one summary associated with each row based on the attention mechanism.

11. The computer-implemented method of claim 10, further comprising receiving, via a chat interface, a user question or command associated with the at least one summary, wherein the providing the numerical tensor representation as input includes calling the language model with a query in response to the receiving of the user question, and wherein the language model executes the query and generates an answer based on retrieving information from the at least one summary.

12. The computer-implemented method of claim 11, further comprising:

receiving, via a chat interface, a user question or command associated with the at least one summary;

generating, via a machine learning model, a prediction indicative of at least one of: an indication of the account or the lead that should be sent a digital marketing advertisement, a particular campaign to use for the account or the lead, and a particular channel and time to provide the digital marketing advertisement or the particular campaign, and wherein a response to the user question or command is further based on the prediction.

13. The computer-implemented method of claim 10, wherein the lead is a member of the account, and wherein the account is a particular organization.

14. The computer-implemented method of claim 10, wherein the one or more tables include a first table and a second table, and wherein the computer-implemented method further comprises stitching the first table and the second table together such that the first table and the second table are merged.

15. The computer-implemented method of claim 10, wherein the one or more tables includes at least one of: a role of each lead, user activity data of each lead, opportunity stage and type of each lead, an advertising campaign that was used for each lead, account name, account industry, revenue amount of each account, or a number of employees of each account.

16. The computer-implemented method of claim 10, wherein the operations further comprising preprocessing the lead data and the account data, and wherein the preprocessing includes anonymizing all personally identifiable information.

17. The computer-implemented method of claim 10, wherein the at least one summary summarizes user activity data of a first lead and at least a second lead for an account.

18. A computer system comprising:

a user activity extractor means for accessing, from the one or more computer storage media, data from one or more tables, the data includes at least one of lead data of a lead and account data of an account, each table, of the one or more tables having one or more columns and one or more rows, each column, of the one or more columns, having a column name, each row, of the one or more rows, having one or more values corresponding to statistics of computer user input of the lead or the account;

a verbalization component means for generating, for each column name and via computer natural language processing, a machine-readable tag that indicates a semantic meaning of a respective column name of the one or more tables;

wherein the verbalization component means further for generating one or more natural language sentences by combining at least the computer-readable tag with the one or more values corresponding to the statistics of computer user input of the lead or account for each row of the one or more tables; and a summarization component means for encoding the one or more natural language sentences into a numerical tensor representation and providing the numerical tensor representation as input into a language model comprising an attention mechanism, wherein an output layer of the language model generates an embedding vector representing at least one summary associated with each row based on the attention mechanism.

19. The system of claim 18, further comprising:

a chat interface component means for receiving a user question or command via a chat interface;

wherein the chat interface component means is further for providing the first language model or a second language model with the summary and the user question or command as input in response to receiving of the user question or command; and wherein the chat interface component means is further for receiving an output comprising a response to the user question or command based on the providing.

* * * * *